(12) United States Patent
Nakamori et al.

(10) Patent No.: US 6,647,326 B2
(45) Date of Patent: Nov. 11, 2003

(54) DRIVING CONTROL DEVICE OF VEHICLE

(75) Inventors: Yukinori Nakamori, Anjo (JP); Satoru Wakuta, Anjo (JP); Yasunori Mano, Anjo (JP); Takehiko Suzuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/310,058

(22) Filed: Dec. 5, 2002

(65) Prior Publication Data

US 2003/0109970 A1 Jun. 12, 2003

(30) Foreign Application Priority Data

Dec. 7, 2001 (JP) .................................. 2001-373917

(51) Int. Cl.$^7$ ............................................... B60L 11/00
(52) U.S. Cl. ............................ 701/22; 701/51; 701/54; 477/158
(58) Field of Search ........................ 701/22, 51, 54; 477/156, 158, 90, 8, 3, 119; 180/65.3

(56) References Cited

U.S. PATENT DOCUMENTS 5,884,601 A * 3/1999 Robinson .................. 123/196 S
6,258,008 B1 * 7/2001 Tabata et al. ................ 477/107

FOREIGN PATENT DOCUMENTS

JP         A 8-14076         1/1996

* cited by examiner

*Primary Examiner*—Marthe Y. Marc-Coleman
(74) *Attorney, Agent, or Firm*—Oliff & Berridge, PLC

(57) ABSTRACT

A driving control device of a vehicle including an automatic transmission with a hydraulic control device which hydraulically controls an engagement of the frictional engagement element, a mechanical oil pump which is driven by the engine and supplies hydraulic pressure to the hydraulic control device and an electric oil pump which supplies hydraulic pressure to the hydraulic control device and a motor connected to the mechanical oil pump and transmitting the driving force to the automatic transmission, wherein the electric oil pump supplies oil to the hydraulic control device at an engine automatic stopping control time at which the driving of the engine is automatically stopped after the vehicle stops and a predetermined condition is established and the motor is driven so that said mechanical oil pump supplies the oil to the hydraulic control device during the engine automatic stopping control at a time when the electric oil pump can not be driven.

18 Claims, 10 Drawing Sheets

|      | C1 | C2 | C3 | B1 | B2 | B3 | B4 | B5 | F1 | F2 |
|------|----|----|----|----|----|----|----|----|----|----|
| N    |    |    |    |    |    |    |    | ○  |    |    |
| 1ST  | ○  |    |    |    |    | △  |    | ○  |    | ○  |
| 2ND  | ○  |    |    | △  | ○  |    |    | ○  | ○  |    |
| 3RD  | ○  |    |    | △  | ○  |    | ○  |    | ○  |    |
| 4TH  | ○  |    | ○  | △  | ○  |    |    |    | ○  |    |
| 5TH  | ○  | ○  | ○  |    |    |    |    |    |    |    |
| REV  |    | ○  |    |    |    | ○  |    | ○  |    |    |

FIG. 3(b)

$N_{A1}$ AND $N_{A2}$ ARE SMALLER THAN PREDETERMINED SPEED $N_{A4}$ AT MOTORING TIME

② AT OIL TEMPERATURE < $T_{MIN}$, AT OIL TEMPERATURE > $T_{MAX}$

DRIVING CONTROL DEVICE OF VEHICLE

BACKGROUND OF THE INVENTION

1. Field of Invention

The invention relates to a driving control device of a vehicle, for example, a hybrid vehicle, performing an idling stop and the like.

2. Description of Related Art

In recent years, in order to reduce an exhaust gas, improve a fuel economy and the like, there has been developed various kinds of vehicles, such as a hybrid vehicle, in which an engine automatic stopping control (hereinafter, an engine stopping control) for automatically stopping a driving of an engine is executed at a time when a vehicle stops, for example, while waiting at stoplights or the like during a movement of the vehicle or a predetermined stop condition is established, a vehicle performing an idling stop, and the like. Further, these vehicles are structured such as to restart after the driving of the engine in the vehicle is automatically stopped.

Meanwhile, the vehicle mentioned above is provided with an automatic transmission performing an automatic speed change in accordance with a hydraulic control. In the automatic transmission, a hydraulic pressure generated by a mechanical oil pump driven by an engine or a motor is controlled by a hydraulic control device. Then, engagement and disengagement of a predetermined number of frictional engagement elements are controlled in accordance with a predetermined speed change control on the basis of a vehicle traveling condition or the like by the controlled hydraulic pressure, whereby the automatic speed change control is performed.

However, in the vehicle mentioned above, the mechanical oil pump stops together with the driving source at a time when the engine driving is automatically stopped. Accordingly, when the engine driving is automatically stopped, the hydraulic pressure supplied from the mechanical oil pump is reduced, and it is impossible to maintain a predetermined hydraulic pressure necessary for engaging the frictional engagement element. When the engine is restarted under a state in which the hydraulic pressure of the hydraulic control device can not be maintained in the predetermined hydraulic pressure, a lot of time is required until the hydraulic pressure is increased, so that a lot of time is required until the frictional engagement element is engaged, and a response is deteriorated.

Further, since the mechanical oil pump is also restarted, the hydraulic pressure supplied from the mechanical oil pump to the hydraulic control device is increased. Further, when the hydraulic pressure supplied to the hydraulic control device is increased to the predetermined hydraulic pressure, the frictional engagement element mentioned above is again engaged. Accordingly, a shock is generated.

Accordingly, there is proposed, for example, in Japanese Patent Publication No. 8-14076, an automatic transmission structured such that an electric oil pump provided with a motor independent from the driving source of the vehicle is provided separately from the mechanical oil pump mentioned above, and a predetermined hydraulic pressure necessary for engaging the frictional engagement element is maintained in the hydraulic control device by driving the electric oil pump so as to supply the hydraulic pressure to the hydraulic control device at a time when the mechanical oil pump is stopped.

In accordance with the automatic transmission disclosed in this Publication, since it is possible to maintain the hydraulic pressure of the hydraulic control device in the predetermined hydraulic pressure necessary for engaging the frictional engagement element by the electric oil pump, even at a time of the automatic stop of the mechanical oil pump, the frictional engagement element engaged at the starting time can be securely set in the engagement state, and it is possible to prevent the shock at a time of engaging the frictional engagement element.

SUMMARY OF THE INVENTION

However, in the automatic transmission in the Publication mentioned above, in order to operate the electric oil pump so as to secure the clutch hydraulic pressure in order to have no engagement shock at a time of restarting the engine as mentioned above during the automatic stop of the driving of the vehicle engine, a high torque motor is required. A high motor torque is required because a viscosity of an automatic transmission oil (hereinafter, refer also to ATF) is increased and a drive load (torque) of the electric oil pump is increased at a low oil temperature (a low oil temperature in comparison with an oil temperature in a normal use) of the ATF. Further, since the viscosity of the ATF is reduced and a consumption flow rate of the ATF in the automatic transmission (A/T) is increased reversely at a high oil temperature (a high oil temperature in comparison with the oil temperature in the normal use) of the ATF, a high rotation motor is required. Accordingly, in order to operate the electric oil pump in such a manner as to prevent the engagement shock from being generated at a time of restarting the engine in all of the oil temperature ranges, an increase in size of the electric oil pump is caused.

Further, when operating the electric oil pump under a severe condition of the low oil temperature or the high oil temperature, there can also be considered that problems may generate such that the operation time of the electric oil pump is reduced, a durability of the electric oil pump is reduced, and the like.

Further, when the electric oil pump fails and can not be used, it is impossible to supply the hydraulic pressure by the electric oil pump, and it is impossible to supply the hydraulic pressure for engaging the frictional engagement element at the engine stop time. Therefore, there is similarly generated a problem that the shock is generated at a time of reengaging the frictional engagement element.

The invention is thus made by taking the foregoing situation into consideration, and the invention thus provides a driving control device of a vehicle which can reduce a shock generated by an engagement of a frictional engagement element without requiring an increase in the size of an electric oil pump, even at a time when the electric oil pump can not be driven. For example, at a time of the low oil temperature or the high oil temperature as mentioned above during an automatic stop of the engine driving in the vehicle, or at a time when the electric oil pump can not be used.

In order to solve the foregoing, a driving control device of a vehicle according to an exemplary aspect of the invention includes an automatic transmission that transmits a driving force of an engine to a wheel by engaging a frictional engagement element, the automatic transmission including a hydraulic control device which hydraulically controls an engagement of the frictional engagement element, a mechanical oil pump which is driven by the engine and supplies hydraulic pressure to the hydraulic control device and an electric oil pump which supplies hydraulic pressure to the hydraulic control device and a motor connected to the mechanical oil pump and transmitting the driving force to the automatic transmission, wherein the electric oil pump supplies oil to the hydraulic control device at an engine automatic stopping control time at which the driving of the engine is automatically stopped after the vehicle stops and a predetermined condition is established and the motor is driven so that said mechanical oil pump supplies the oil to the hydraulic control device during the engine automatic stopping control at a time when the electric oil pump can not be driven.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 shows one example of the automatic transmission to which the invention is applied, in which FIG. 3B is a table of operation thereof;

FIG. 6-1 is a view describing a driving control of an engine in the case that an electric oil pump can be used, and FIG. 6-2 is a view describing the driving control of the engine in the case that the electric oil pump can not be used;

DETAILED DESCRIPTION OF PREFERRED EMBODIMENTS

Hereafter, embodiments of a driving control device according to the invention will be described with reference to accompanying drawings.

Figure 1:
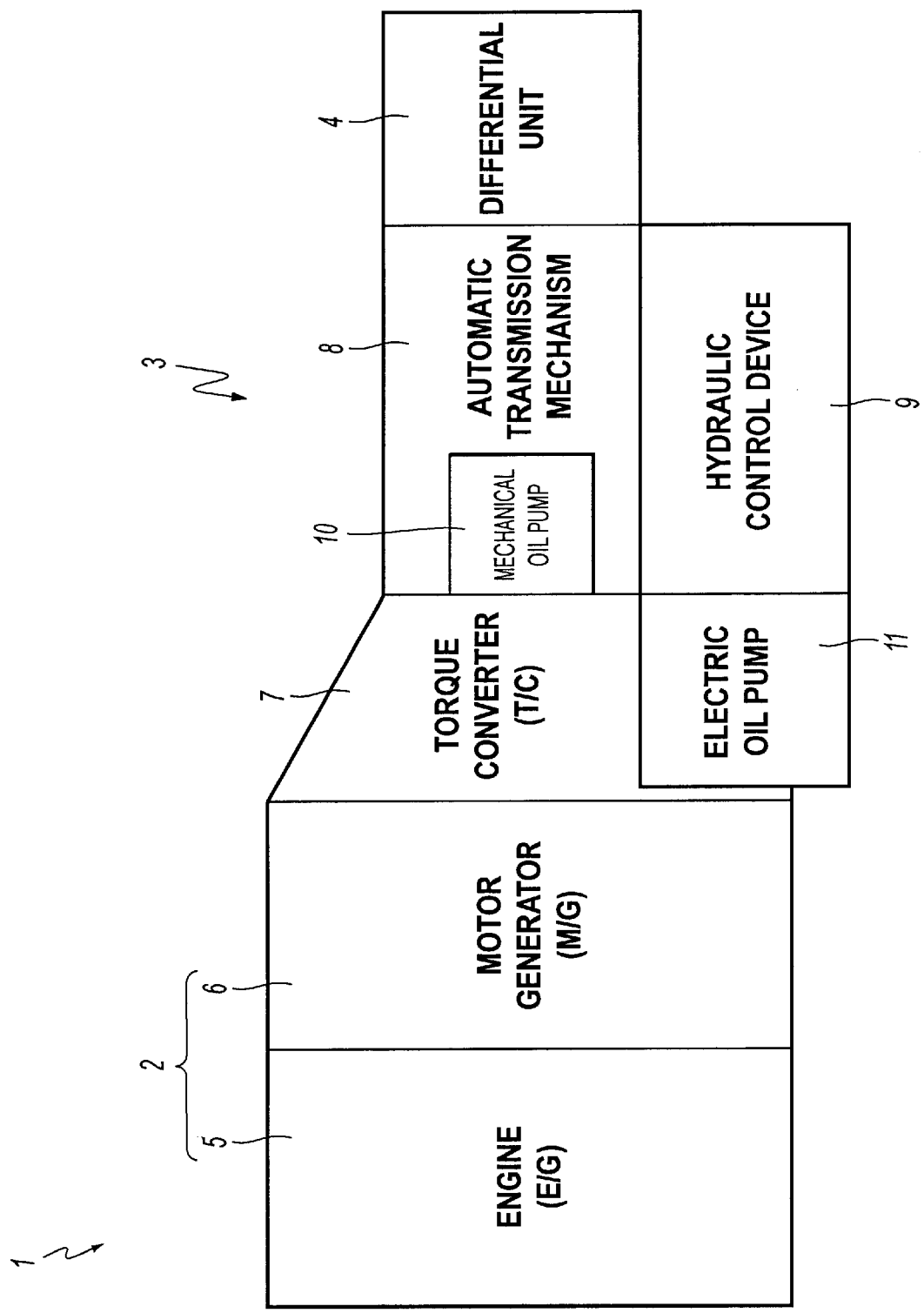
FIG. 1 is a block diagram schematically showing a driving system of a vehicle to which one example of an embodiment of a driving control device of the vehicle according to the invention is applied.
Figure 2:
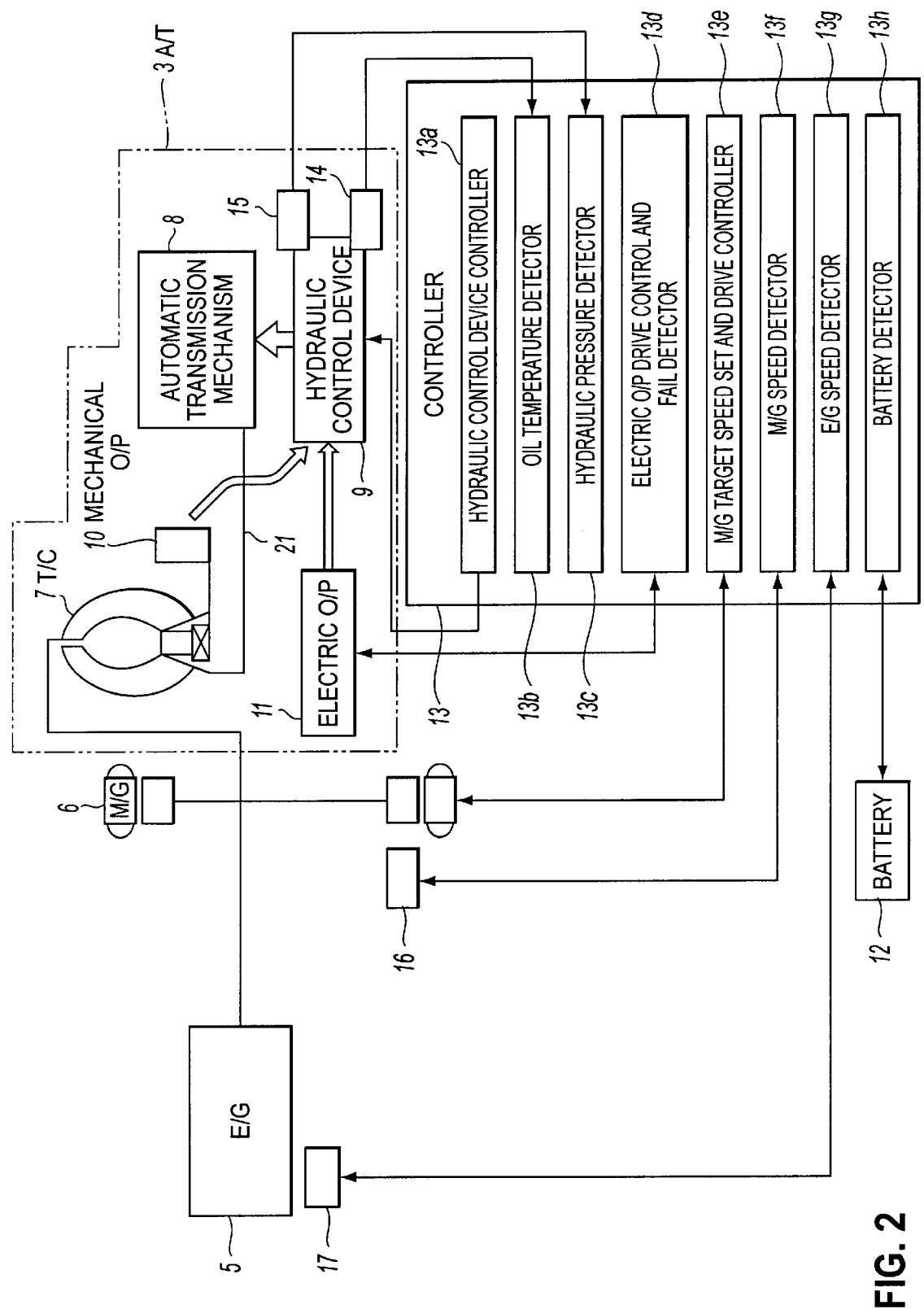
FIG. 2 is a block diagram showing respective driving control devices of an engine, a motor generator and an automatic transmission in the driving control device of the vehicle according to the invention.

FIG. 1 is a block diagram schematically showing a driving system of a vehicle to which one example of an embodiment of a driving control device of the vehicle according to the invention is applied, and FIG. 2 is a block diagram schematically showing a connection between respective constituting elements in the driving control device of the vehicle according to this embodiment.

As shown in FIG. 1, a driving system 1 of a vehicle in a driving control device of a vehicle according to this embodiment is constituted by a driving source 2 of the vehicle, an automatic transmission (A/T) 3 and a differential unit 4. The driving source 2 is constituted by an engine (E/G) 5 and a motor generator (M/G) 6. The automatic transmission 3 is constituted by a torque converter (T/C) 7, an automatic transmission mechanism 8, a hydraulic control device 9, a mechanical oil pump (mechanical O/P) 10 and an electric oil pump (electric O/P) 11.

As shown in FIG. 3, the engine 5, the motor generator 6 and the mechanical oil pump 10 are mechanically connected to each other, and are set so that all of a speed of the engine 5, a speed of the motor generator 6 and a speed of the mechanical oil pump 10 are equal to each other.

The engine 5 is started by the motor generator 6, and outputs a driving force corresponding to a stepping amount of an accelerator pedal by a driver. The motor generator 6 is started by turning on an ignition switch by the driver. Further, the motor generator 6 starts the engine 5 as mentioned above on the basis of this driving force at a time of outputting the driving force, and drives the vehicle together with the driving force of the engine 5. Further, when the driving force is input, the motor generator 6 generates an electric power, and the generated electricity is stored in a battery 12 of the vehicle.

The engine 5 and the motor generator 6 are connected to a driving side of the torque converter 7, and the driving forces thereof are supplied to the driving side of the torque converter 7. Further, the motor generator 6, the hydraulic control device 9 and the electric oil pump 11 are structured such as to be respectively driven and controlled by a controller 13 which is electrically connected thereto.

As shown in FIG. 2, the hydraulic control device controller 13a, oil temperature detector 13b, hydraulic pressure detector 13c, drive control and fail detector for an electric oil pump (electric O/P) 13d, target speed set and drive controller for a motor generator (M/G) 13e, motor generator (M/G) speed detector 13f, engine (E/G) speed detector 13g, and battery detector 13h are respectively provided in the controller 13.

The hydraulic control device 9 is connected to the hydraulic control device controller 13a, and the hydraulic control device controller 13a controls the hydraulic control device 9 in accordance with a predetermined speed change control on the basis of a vehicle traveling condition or the like.

A hydraulic sensor 14 is connected to the oil temperature detector 13b, and the oil temperature detector 13b is structured such as to detect an oil temperature of a working fluid within the hydraulic control device 9 on the basis of a detection signal from the hydraulic sensor 14.

A hydraulic pressure sensor 15 is connected to the hydraulic pressure detector 13c, and the hydraulic pressure detector 13c is structured such as to detect the hydraulic pressure of the working fluid within the hydraulic control device 9 in accordance with a detected signal from the hydraulic pressure sensor 15.

The electric oil pump 11 is connected to the electric oil pump drive control and fail detector 13d so that the signal can be input and output in a bidirectional manner therebetween, and the electric oil pump drive control and fail detector 13d is structured such as to drive and control the electric oil pump 11 on the basis of the oil temperature of the hydraulic control device 9 detected by the oil temperature detector, and detect a failure of the electric oil pump 11.

The motor generator 6 is connected to the motor generator (M/G) target speed set and drive controller 13e so that the signal can be input and output in a bidirectional manner therebetween, and a magnetic pole position detection sensor 16 is connected to the motor generator (M/G) speed detector 13f. The motor generator (M/G) target speed set and drive controller 13e is structured such as to set a target speed of the motor generator 6 (that is, a target speed of the engine 5), and drive and control the motor generator 6. The motor generator speed detector 13f is structured such as to detect a speed of the motor generator 6 on the basis of the detected signal from the magnetic pole position detection sensor 16. Further, the motor generator target speed set and drive controller 13e controls the driving of the motor generator on the basis of the motor generator speed detection signal from the magnetic pole position detection sensor 16 so as to achieve a set target speed. Therefore, the driving of the engine 5 is controlled so as to achieve a target speed.

Further, the engine speed detector 13g is structured such as to detect an engine speed $N_E$ in accordance with a detection signal from an engine speed sensor 17.

The battery 12 is connected to the battery detector 13h so that the signal can be input and output in a bidirectional manner therebetween, and the battery detector 13h detects a voltage of the battery 12 so as to charge and control in accordance with a power generation of the motor generator 6 so that the voltage of the battery 12 becomes a predetermined voltage.

Further, the controller 13 drives and controls the electric oil pump 11 on the basis of the detection signal of the oil temperature of the working fluid within the hydraulic control device 9 output from the hydraulic sensor 14, the detection signal of the speed of the motor generator 6 output from the magnetic pole position detection sensor 16 and the detection signal of the engine speed output from the engine speed sensor 17.

The mechanical oil pump 10 is driven by respective driving forces of the engine 5 and the motor generator 6 so as to supply the hydraulic pressure to the hydraulic control device 9, and the electric oil pump 11 is driven by a supply voltage from the battery 12, shown in FIG. 3, corresponding to a power source so as to supply the hydraulic pressure to the hydraulic control device 9.

Then, the driver turns on the ignition switch, whereby the motor generator 6 is driven, and the engine 5 is started on the basis of the driving of the motor generator 6. In a normal traveling state, the engine 5 outputs the driving force corresponding to the stepping amount of the accelerator pedal by the driver, and the driving force is input to the automatic transmission mechanism 8 via the torque converter 7. At this time, the controller 13 controls the hydraulic control device 9 in accordance with a predetermined automatic speed change control on the basis of the vehicle traveling condition or the like. The hydraulic control device 9 controls the hydraulic pressure supplied to a plurality of frictional engagement elements such as the clutch of the automatic transmission mechanism 8, the brake and the like by being controlled by the controller 13. As mentioned above, the automatic transmission mechanism 8 is controlled by the hydraulic control device 9, thereby changing the speed of the input driving force in accordance with the predetermined automatic speed change control on the basis of the vehicle traveling condition or the like so as to output it to the differential unit 4, and the differential unit 4 outputs the transmitted driving force to each of the drive wheels.

Figure 3A:
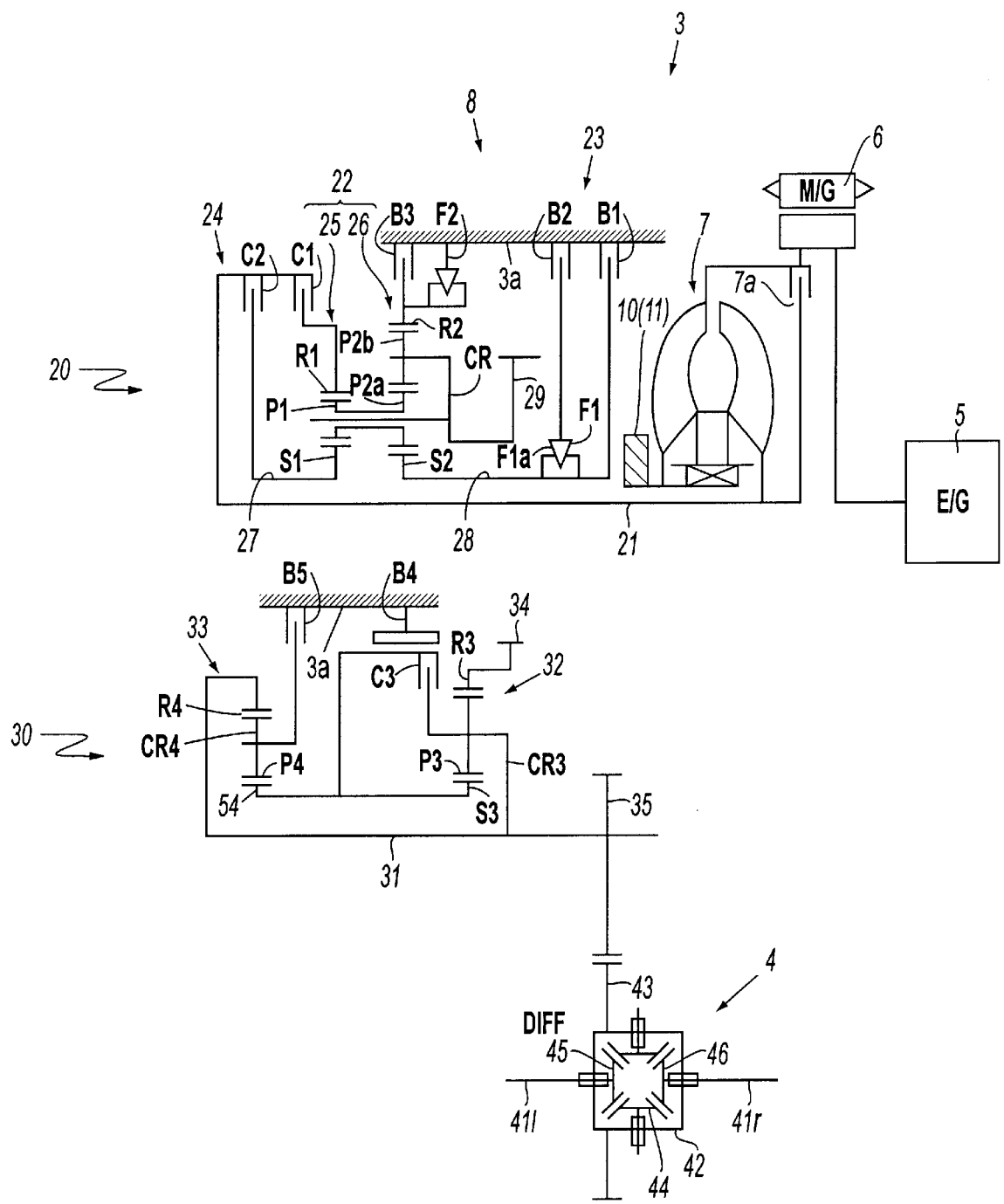
FIG. 3A is a skeleton view of the example.

A description will be next given more specifically about the automatic transmission 3. FIG. 3 shows the automatic transmission 3, in which FIG. 3A is a skeleton view thereof, and FIG. 3B is a table of operation thereof.

As shown in FIG. 3A, the automatic transmission 3 is constituted by a main speed change mechanism 20 and an auxiliary speed change mechanism 30. The main speed change mechanism 20 is arranged on a first shaft which is arranged in line with an output shaft of the engine 5, and the torque converter 7 having a lock-up clutch 7a and the automatic transmission mechanism 8 are respectively arranged on the first shaft from the sides of the engine 5 and the motor generator 6 in this order.

Further, the main speed change mechanism 20 is provided with the mechanical oil pump 10 connected to the drive side of the torque converter 7 coaxially with an input shaft 21 of the automatic transmission mechanism 8, to be mentioned later, and the electric oil pump 11 is adjacent to the torque converter 7. In this case, FIG. 3A describes the electric oil pump 11 at the same position as that of the mechanical oil pump 10 by attaching parentheses. However, this is described as a matter of convenience for description, and the electric oil pump 11 is not practically provided coaxially with the input shaft 21.

The automatic transmission mechanism 8 is provided with the input shaft 21 constituting the first shaft, and the structure is made such that the respective driving forces from the engine 5 and the motor generator 6 are transmitted to the input shaft 21 through the torque converter 7.

Further, the automatic transmission mechanism 8 is provided with a planetary gear unit portion 22, a brake portion 23 and a clutch portion 24. The planetary gear unit portion 22 is provided with a single pinion planetary gear 25 and a double pinion planetary gear 26. The single pinion planetary gear 25 is constituted by a sun gear S1, a ring gear R1, and a carrier CR which rotatably supports a pinion P1 engaged with these gears S1 and R1. Further, the double pinion planetary gear 26 is constituted by a sun gear S2, a ring gear R2, and a carrier CR which rotatably supports a pinion P2a engaged with the sun gear S2 and a pinion P2b engaged with the ring gear R2 so as to engage with each other.

The sun gear S1 and the sun gear S2 are supported to respective hollow shafts 27 and 28 which are rotatably supported to the input shaft 21, and are structured rotatable relatively with respect to the input shaft 21. Further, the carrier CR is common to both of the planetary gears 25 and 26 mentioned above, and the pinion P1 and the pinion P2a supported to the carrier CR and respectively engaged with the sun gears S1 and S2 are both connected so as to integrally rotate.

The brake portion 23 is provided with a one-way clutch F1, a one-way clutch F2, a brake B1, a brake B2 and a brake B3. The one-way clutch F1 is provided between the brake B2 and the hollow shaft 28 supporting the sun gear S2, and the one-way clutch F2 is provided between the ring gear R2 and the case 3a of the automatic transmission 3. The brake B1 is provided between the hollow shaft 28 supporting the sun gear S2 and the case 3a of the automatic transmission 3, and is structured such as to engage the hollow shaft 28 with the case 3a of the automatic transmission 3 so as to stop the rotation of the sun gear S2. Further, the brake B2 is provided between an outer race $F1_a$ side of the one-way clutch F1 and the case 3a of the automatic transmission 3, and is structured such as to engage the outer race $F1_a$ side with the case 3a of the automatic transmission 3 so as to stop the rotation of the outer race $F1_a$ side of the one-way clutch F1. Further, the brake B3 is provided between the ring gear R2 and the case 3a of the automatic transmission 3, and is structured such as to engage the ring gear R2 with the case 3a of the automatic transmission 3 so as to stop the rotation of the ring gear R2.

The clutch portion 24 is provided with a forward clutch C1 and a direct clutch C2. The forward clutch C1 is provided between an outer peripheral side of the ring gear R1 and the input shaft 21, and is structured such as to connect the input shaft 21 to the ring gear R1 or shut off the connection. Further, the direct clutch C2 is provided between the hollow shaft 27 supporting the sun gear S1 and the input shaft 21, and is structured such as to connect the input shaft 21 to the hollow shaft 27 or shut off the connection.

A counter drive gear 29 is connected to the carrier CR so as to integrally rotate with the carrier CR, whereby an output portion of the main speed change mechanism 20 is constructed.

Meanwhile, the auxiliary speed change mechanism 30 is arranged on a second shaft 31 which is arranged in parallel to the first shaft constituted by the input shaft 21, and is provided with two single pinion planetary gears 32 and 33. The single pinion planetary gear 32 is constituted by a sun gear S3, a ring gear R3, a pinion P3 engaged with these gears S3 and R3, and a carrier CR3 rotatably supporting the pinion P3. Further, the single pinion planetary gear 33 is constituted by a sun gear S4, a ring gear R4, a pinion P4 engaged with these gears S4 and R4, and a carrier CR4 rotatably supporting the pinion P4.

The sun gear S3 and the sun gear S4 are integrally connected to each other so as to be supported rotatably with respect to a second shaft 31. Further, the carrier CR3 is connected to the second shaft 31, and is connected to the ring gear R4 via the second shaft 31. Accordingly, in the auxiliary speed change mechanism 30, a Simpson type gear train is constructed.

An under drive (UD) direct clutch C3 is provided between the integrally connected sun gears S3 and S4 and the carrier CR3, and the UD direct clutch C3 is structured such as to connect the sun gears S3 and S4 to the carrier CR3 or shut off the connection. Further, a brake B4 is provided between the sun gears S3 and S4 and the case 3a of the automatic transmission 3, and the brake B4 engages the sun gears S3 and S4 with the case 3a of the automatic transmission 3 so as to stop the rotation of the sun gears S3 and S4. Further, a brake B5 is provided between the carrier CR4 and the case 3a of the automatic transmission 3, and the brake B5 engages the carrier CR4 with the case 3a of the automatic transmission 3 so as to stop the rotation of the carrier CR4. In the auxiliary speed change mechanism 30 structured in this manner, a speed change stage having three forward speeds can be obtained.

A counter driven gear 34 engaged with a counter drive gear 29 of the main speed change mechanism 20 is connected to the ring gear R3 so as to integrally rotate with the ring gear R3, whereby an input portion of the auxiliary speed change mechanism 30 is constructed. Further, a decelerating gear 35 is connected to the second shaft 31 to which the carrier CR3 and the ring gear R4 are connected, whereby an output portion of the auxiliary speed change mechanism 30 is constructed.

Further, the differential unit 4 is arranged on a third shaft which is arranged in parallel to the input shaft 21, which is the first shaft, and the second shaft 31, and this third shaft is constituted by left and right axles 41l and 41r to be mentioned later. The differential unit 4 is provided with a differential case 42, and an input gear 43 engaged with the decelerating gear 35 mentioned above is fixed to the differential case 42.

A differential gear 44 and left and right side gears 45 and 46 respectively engaged with the differential gear 44 are rotatably supported to an inner portion of the differential case 42. The left and right axles 41l and 41r are respectively extending from left and right side gears 45 and 46.

Therefore, the rotation from the input gear 43 is branched corresponding to a load torque so as to be respectively transmitted to the left and right axles 41l and 41r.

Further, the first shaft (the input shaft 21), the second shaft 31 and the third shaft (the axles 41l and 41r) are, though not shown, respectively arranged in a triangular shape in a side view as conventionally known.

Next, a description will be given on an operation of the automatic transmission 3 structured in the above manner with reference to the table of operation shown in FIG. 3b.

In a forward first speed (1ST), the forward clutch C1, the one-way clutch F2 and the brake B5 are respectively engaged, and the main speed change mechanism 20 and the auxiliary speed change mechanism 30 are both set to the first speed.

In the operation of the first speed in the main speed change mechanism 20, the rotation of the input shaft 21 is decelerated and transmitted to the pinion $P2_b$ via the forward clutch C1, the ring gear R1, the pinion P1 and the pinion $P2_a$, and the pinion $P2_b$ rotates. At this time, since the rotation of the ring gear R2 is inhibited by the engagement of the one-way clutch F2, the carrier CR rotates at the decelerated speed in accordance with the rotation of the pinion $P2_a$, and the decelerated rotation of the carrier CR is output from the counter drive gear 29. The output rotation of the counter drive gear 29 is further decelerated and transmitted to the counter driven gear 34 of the auxiliary speed change mechanism 30.

Next, in the operation of the first speed in the auxiliary speed change mechanism 30, the rotation of the counter driven gear 34 is transmitted to the pinion P4 via the carrier CR3, the pinion P3, the sun gear S3 and the sun gear S4, and the pinion P4 rotates. At this time, since the rotation of the carrier CR4 supporting the pinion P4 is inhibited by the engagement of the brake 5, the ring gear R4 is decelerated and rotated in accordance with the rotation of the pinion P4. The rotation of the ring gear R4 is output from the decelerating gear 35 via the second shaft 31, and the output rotation of the decelerating gear 35 is further decelerated and transmitted to the input gear 43 of the differential unit 4. In the manner mentioned above, the first speed of the main speed change mechanism 20 and the first speed of the auxiliary speed change mechanism 30 are combined, whereby the forward first speed is obtained as a whole of the automatic transmission mechanism 8.

In a forward second speed (2ND), since the forward clutch C1, the one-way clutch F1, the brake B2 and the brake B5 are respectively engaged, the main speed change mechanism 20 is set to a second speed, and an engagement state of a frictional engagement element in the auxiliary speed change mechanism 30 is the same as the first speed of the auxiliary speed change mechanism 30 mentioned above, the auxiliary speed change mechanism 30 is set to the first speed.

In the operation of the second speed of the main speed change mechanism 20, the rotation of the input shaft 21 is decelerated and transmitted to the pinion P2a via the forward clutch C1, the ring gear R1 and the pinion P1, and the pinion P2a rotates. At this time, since the rotation of the sun gear S2 is inhibited by the engagement of the one-way clutch F1 and the brake B2, the carrier CR is decelerated and rotated by the rotation of the pinion $P2_a$, and the decelerated rotation of the carrier CR is output from the counter drive gear 29. The output rotation of the counter drive gear 29 is further decelerated and transmitted to the counter driven gear 34 of the auxiliary speed change mechanism 30.

Since the auxiliary speed change mechanism 30 is set to the first speed, the operation in the auxiliary speed change mechanism 30 is the same as the first speed of the auxiliary speed change mechanism 30 mentioned above, and the rotation of the counter driven gear 34 is transmitted to the input gear 43 of the differential unit 4 in the same manner as the operation of the auxiliary speed change mechanism 30 mentioned above. In the manner mentioned above, the second speed of the main speed change mechanism 20 and the first speed of the auxiliary speed change mechanism 30 are combined, whereby the forward second speed is obtained as a whole of the automatic transmission mechanism 8.

In a forward third speed (3RD), since the forward clutch C1, the one-way clutch F1, the brake B2 and the brake B4 are respectively engaged, and the engagement state of the frictional engagement element in the main speed change mechanism 20 is the same as the second speed of the main speed change mechanism 20 mentioned above, the main speed change mechanism 20 is set to the second speed in the same manner, and the auxiliary speed change mechanism 30 is set to the second speed.

The operation of the second speed in the main speed change mechanism 20 is the same as the second speed mentioned above, and the rotation of the input shaft 21 is decelerated by the second speed of the main speed change mechanism 20 and output from the counter drive gear 29. The output rotation of the counter drive gear 29 is further decelerated and transmitted to the counter driven gear 34 of the auxiliary speed change mechanism 30.

In the operation of the second speed in the auxiliary speed change mechanism 30, the rotation of the counter driven gear 34 is transmitted to the pinion P3 via the ring gear R3, and the pinion P3 rotates. At this time, since the rotation of the sun gear S3 is inhibited by the engagement of the brake B4, the carrier CR3 is decelerated and rotated in accordance with the rotation of the pinion P3. The rotation of the carrier CR3 is output from the decelerating gear 35 via the second shaft 31, and the output rotation of the decelerating gear 35 is further decelerated and transmitted to the input gear 43 of the differential unit 4. In the manner mentioned above, the second speed of the main speed change mechanism 20 and the second speed of the auxiliary speed change mechanism 30 are combined, whereby the forward third speed is obtained as a whole of the automatic transmission mechanism 8.

In a forward fourth speed (4TH), since the forward clutch C1, the one-way clutch F1, the brake B2 and the UD direct clutch C3 are respectively engaged, and the engagement state of the frictional engagement element in the main speed change mechanism 20 is the same as the second speed of the main speed change mechanism 20, the main speed change mechanism 20 is set to the second speed in the same manner, and the auxiliary speed change mechanism 30 is set to the third speed (direct connection).

In the operation of the second speed of the main speed change mechanism 20, the operation is the same as the second speed of the main speed change mechanism 20 mentioned above, and the rotation of the input shaft 21 is decelerated by the second speed of the main speed change mechanism 20 and output from the counter drive gear 29. The output rotation of the counter drive gear 29 is further decelerated and transmitted to the counter driven gear 34 of the auxiliary speed change mechanism 30.

In the operation of the third speed (direct connection) of the auxiliary speed change mechanism 30, since the sun gear S3, the carrier CR3, the pinion P3 and the ring gear R3 are directly connected by the engagement of the UD direct clutch C3, a direct connection rotation in which the counter driven gear 34 and both of the planetary gears 32 and 33 integrally rotate is performed. That is, the rotation of the counter driven gear 34 is transmitted to the decelerating gear 35 via the second shaft 31 as it is and is output from the decelerating gear 35, and the output rotation of the decelerating gear 35 is transmitted to the input gear 43 of the differential unit 4. In the manner mentioned above, the second speed of the main speed change mechanism 20 and the third speed (direct connection) of the auxiliary speed change mechanism 30 are combined, whereby the forward fourth speed is obtained as a whole of the automatic transmission mechanism 8.

In a forward fifth speed (5TH), since the forward clutch C1, the direct clutch C2 and the UD direct clutch C3 are respectively engaged, the main speed change mechanism 20 is set to the third speed (direct connection). Moreover, and the engagement state of the frictional engagement element of the auxiliary speed change mechanism 30 is the same as the third speed (direct connection) of the auxiliary speed change mechanism 30 mentioned above, the auxiliary speed change mechanism 30 is set to the third speed (direct connection).

In the operation of the third speed (direct connection) of the main speed change mechanism 20, since the sun gear S1, the sun gear S2, the ring gear R1, the carrier CR, the pinion P1, the pinion P2$a$, the pinion P2$_b$, the ring gear R1 and the ring gear R2 are directly connected by the engagement of the forward clutch C1 and the direct clutch C2, the direct connection rotation in which the input shaft 21, the gear unit 31 and the counter drive gear 29 integrally rotates is performed. Accordingly, the rotation of the input shaft 21 is output from the counter drive gear 29 without being changed in speed, and the output rotation of the counter drive gear 29 is further decelerated and transmitted to the counter driven gear 34 of the auxiliary speed change mechanism 30 in the same manner as mentioned above.

In the operation of the third speed (direct connection) of the auxiliary speed change mechanism 30, the rotation of the counter driven gear 34 is output from the decelerating gear 35 in the same manner as the third speed (direct connection) of the auxiliary speed change mechanism 30 mentioned above, and the output rotation of the decelerating gear 35 is transmitted to the input gear 43 of the differential unit 4. In the manner mentioned above, the third speed (direct connection) of the main speed change mechanism 20 and the third speed (direct connection) of the auxiliary speed change mechanism 30 are combined, whereby the forward fifth speed is obtained as a whole of the automatic transmission mechanism 8.

In a reverse (REV), since the direct clutch C2, the brake B3 and the brake B5 are respectively engaged, the main speed change mechanism 20 is set to the reverse, and the engagement state of the frictional engagement element in the auxiliary speed change mechanism 30 is the same as the first speed of the auxiliary speed change mechanism 30 mentioned above, the auxiliary speed change mechanism 30 is set to the first speed.

In the operation of the reverse of the main speed change mechanism 20, the rotation of the input shaft 21 is decelerated and transmitted to the pinion P2$_b$ via the direct clutch C2, the sun gear S1, the pinion P1 and the pinion P2$_a$. At this time, since the rotation of the ring gear R2 is inhibited by the engagement of the brake B3, both of the pinions P1 and P2$_a$ rotate in a reverse direction to the input shaft 21, and the pinion P2$_b$ rotates in the same direction as the input shaft 21, the carrier CR is decelerated and rotate in the reverse direction to the input shaft 21. Accordingly, the rotation of the input shaft 21 is decelerated in the reverse direction, and is output in the shape of the reverse rotation from the counter drive gear 29. The output rotation of the counter drive gear 29 is further decelerated and transmitted to the counter driven gear 34 of the auxiliary speed change mechanism 30.

Since the auxiliary speed change mechanism 30 is set to the first speed, the operation in the auxiliary speed change mechanism 30 is the same as the first speed of the auxiliary speed change mechanism 30 mentioned above, and the rotation of the counter driven gear 34 is transmitted to the input gear 43 of the differential unit 4 in the same manner as the operation of the auxiliary speed change mechanism 30 mentioned above in the first speed. In the manner mentioned above, the reverse of the main speed change mechanism 20 and the first speed of the auxiliary speed change mechanism 30 are combined, whereby the reverse (REV) is obtained as a whole of the automatic transmission mechanism 8.

In this case, in FIG. 3$b$, a triangular symbol denotes engagement at a time when an engine brake is operated. That is, in the first speed, the brake B3 is engaged at a time when the engine brake is operated, and the ring gear R2 is fixed by means of the engagement of the brake B3 in place of the engagement of the one-way clutch F2 mentioned above. In the second speed, the third speed, and the fourth speed, the brake B1 is engaged at a time when the engine brake is operated, and the sun gear S2 is fixed by means of the engagement of the brake B1 in place of the engagement of the one-way clutch F1 mentioned above.

Figure 4:
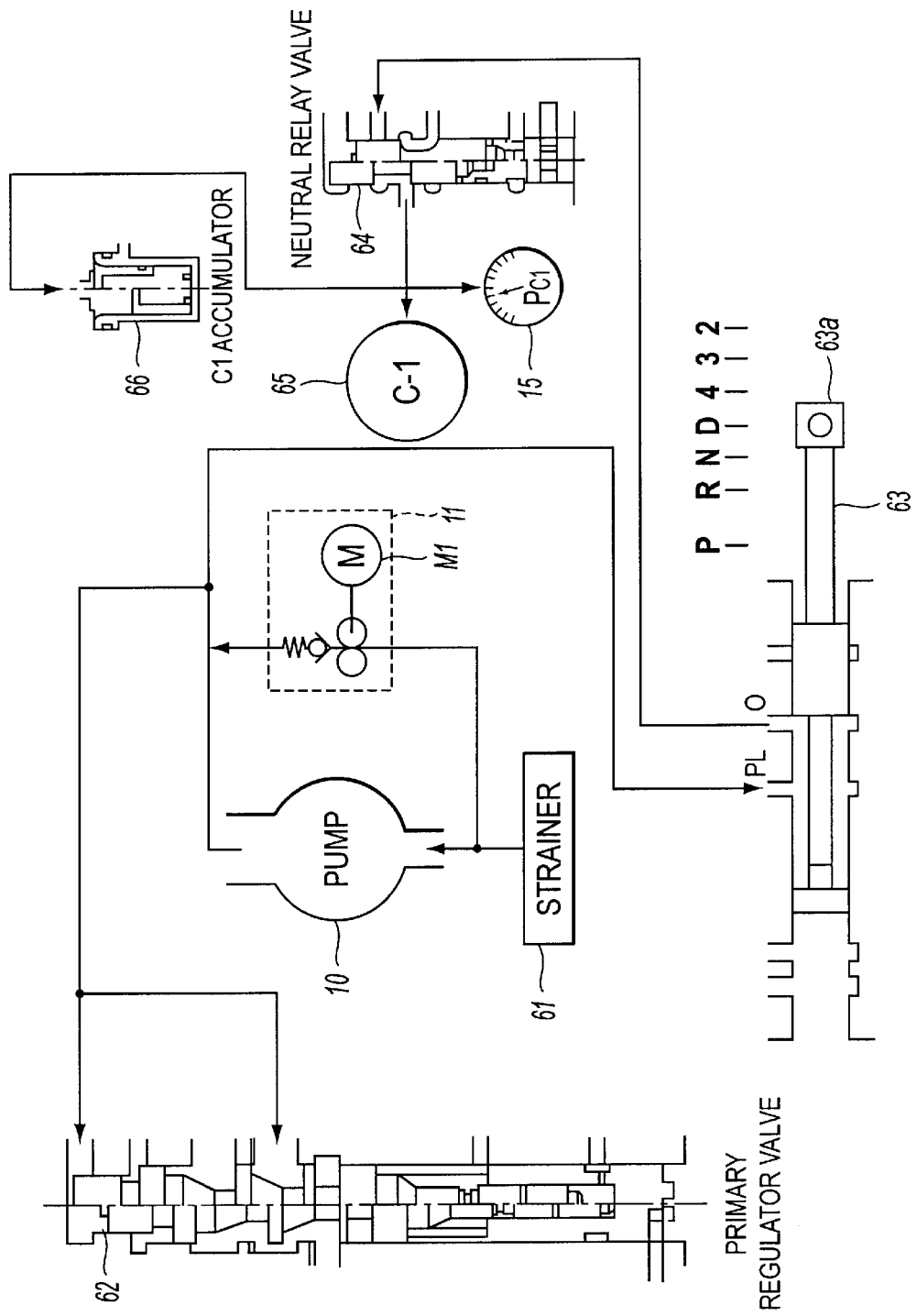
FIG. 4 is a view schematically showing a part of constituting elements and a part of a hydraulic circuit in a hydraulic control device of the automatic transmission to which the invention is applied.

Next, a description will be given on the hydraulic control device 9. FIG. 4 is a view schematically showing respective parts of constituting elements and hydraulic circuit of the hydraulic control device 9. FIG. 4 shows a part relating to an embodiment of the invention, and an illustration of the other constituting elements and the other hydraulic circuits of the hydraulic control device 9 is omitted.

As shown in FIG. 4, the mechanical oil pump 10 is driven by the engine 5 and the motor generator 6 so as to suck the ATF from a strainer 61 and discharge it to a primary regulator valve 62. Further, the electric oil pump 11 is driven by a motor M1 so as to suck the ATF from the strainer 61 and discharge it to the primary regulator valve 62 in the same manner as the mechanical oil pump 10 mentioned above. The primary regulator valve 62 regulates a pressure of the ATF discharged from at least one of the mechanical oil pump 10 and the electric oil pump 11 so as to form a line pressure, and the line pressure is supplied to a manual shift valve 63 or the like.

The manual shift valve 63 is structured such as to connect the primary regulator valve 62 (and the pumps 10 and 11) to a neutral relay valve 64 by a manual shift lever 63$a$ being shifted to a drive (D) range, for example, as illustrated, thereby supplying the line pressure to the neutral relay valve 64. The neutral relay valve 64 is structured such as to connect an output side of the manual shift valve 63 to a hydraulic actuator 65 for the forward clutch C1 and an accumulator 66 for the forward clutch C1 so as to supply the line pressure supplied from the manual shift valve 63 and engage the forward clutch C1.

The hydraulic sensor 14 shown in FIG. 3 and the hydraulic pressure sensor 15 shown in FIGS. 2 and 3 are provided in an oil passage connected to the hydraulic actuator 65 for the forward clutch C1, and these sensors 14 and 15 are structured such as to respectively detect an oil temperature of the ATF (an oil temperature of the hydraulic control device 9) supplied to the forward clutch C1 (in particular, the hydraulic actuator 65) and a hydraulic pressure of the forward clutch C1 (that is, a hydraulic pressure of the hydraulic control device 9) P$_{c1}$ for engaging the forward clutch C1.

In this case, the primary regulator valve 62 and the manual shift valve 63 connect output sides thereof (opposing sides to the side of the pumps 10 and 11) to a hydraulic circuit (not shown), and supply the hydraulic pressure to the other constituting elements such as the other valves or the like.

Next, a description will be given on a relation between a hydraulic pressure of the ATF supplied to the hydraulic control device 9 and a flow rate of the ATF, and a relation between an oil temperature of the ATF in the hydraulic control device 9 and a working voltage of the electric oil pump 11.

Figure 5A:
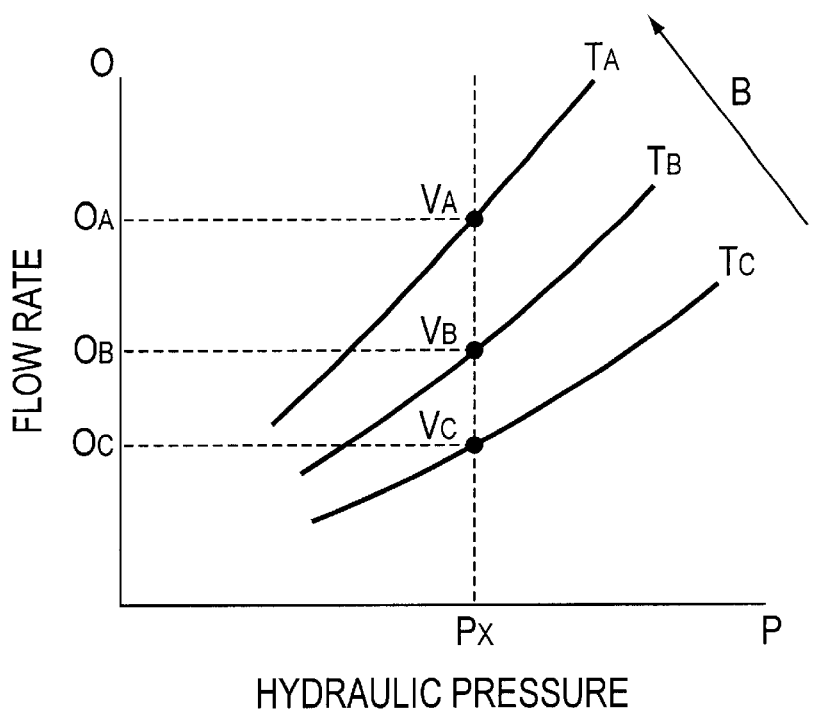
FIG. 5A is a view describing a relation between a hydraulic pressure and a flow rate by setting an oil temperature as a parameter.
Figure 5B:
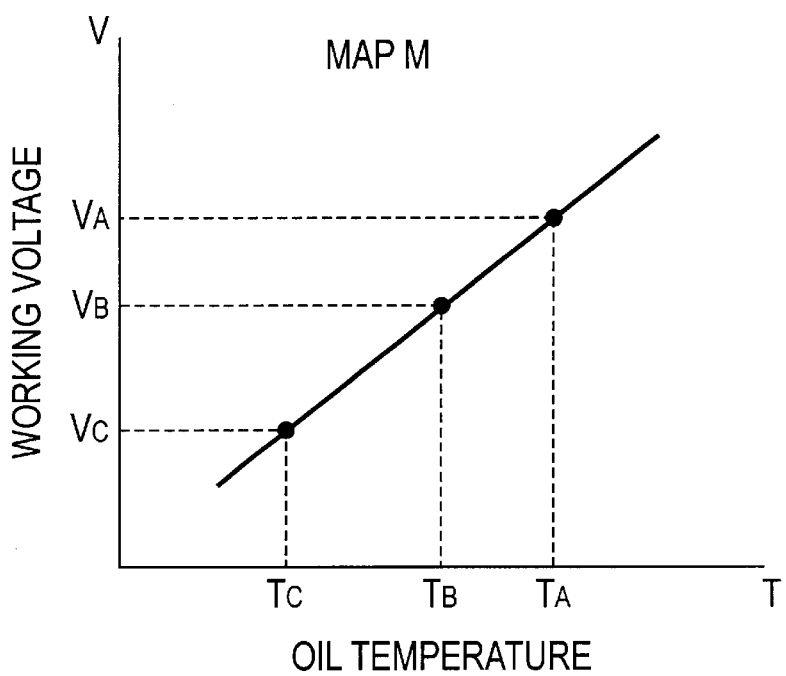
FIG. 5B is a view describing a relation between the oil temperature and a working voltage.

FIG. 5A is a view which describes the relation between the hydraulic pressure and the flow rate by setting the oil temperature to a parameter, and FIG. 5B is a view which describes the relation between the oil temperature and the working voltage. In this case, in FIG. 5A, an arrow B indicates a direction in which the oil temperature becomes high, and accordingly, a relation that oil temperature T$_A$>oil temperature T$_B$>oil temperature T$_C$ is established.

As shown in FIG. 5A, in each of the oil temperatures T$_A$, T$_B$ and T$_C$, a hydraulic pressure P of the ATF supplied to the hydraulic control device 9 and a flow rate Q of the ATF are substantially in proportional. However, in the fixed ATF flow rate Q, when the oil temperature T changes, the hydraulic pressure P changes due to a property of the automatic transmission 3, a change in viscosity caused by the oil temperature change, or the like. That is, in order to obtain the fixed hydraulic pressure P, it is necessary to change the flow rate Q of the ATF corresponding to the change in the oil temperature T. For example, on the assumption that the minimum hydraulic pressure required for engaging the forward clutch C1 is P$_x$, it is necessary to supply a large flow rate Q$_A$ at a high oil temperature T$_A$ for the purpose of obtaining the hydraulic pressure P$_x$, and in the oil temperature T$_B$ lower than the oil temperature T$_A$, it is necessary to supply a smaller flow rate Q$_B$ than the flow rate Q$_A$, and further in the oil temperature T$_C$ lower than the oil temperature T$_B$, it is necessary to supply a smaller flow rate Q$_C$ than the flow rate Q$_B$.

Meanwhile, the flow rate Q of the ATF discharged by the electric oil pump 11 is determined on the basis of the working voltage V supplied to the motor (not shown) of the electric oil pump 11. Then, as shown in FIG. 5A, on the assumption that the working voltage V to be supplied to the electric oil pump 11 so that the flow rate Q of the electric oil pump 11 becomes a flow rate Q$_A$ is set to V$_A$, the working voltage for achieving the flow rate Q$_B$ is set to V$_B$ lower than V$_A$, and the working voltage V for achieving the flow rate Q$_C$ is set to V$_C$ lower than V$_B$, an approximately fixed hydraulic pressure P$_x$ necessary for engaging the forward clutch C1 can be obtained by supplying the working voltage V$_A$ to the electric oil pump 11 at the oil temperature T$_A$, supplying the working voltage V$_B$ to the electric oil pump 11 at the oil temperature T$_B$, and supplying the working voltage V$_C$ to the electric oil pump 11 at the oil temperature T$_C$.

At this time, the oil temperature T and the working voltage V are in the proportional relation, and it is possible to obtain a map M showing a relation between the oil temperature T and the working voltage V of the electric oil pump 11 as shown in FIG. 5B. This map M is previously stored in the controller 13. Therefore, the electric O/P drive control and fail detector 13d detects the working voltage V from the stored map M on the basis of the oil temperature T detected by the oil temperature detector 13b, supplies the detected working voltage V to the electric oil pump 11, and drives and controls the electric oil pump 13 so as to achieve the flow rate Q at which the hydraulic pressure Px engaging the forward clutch C1 can be obtained.

Figure 6A:
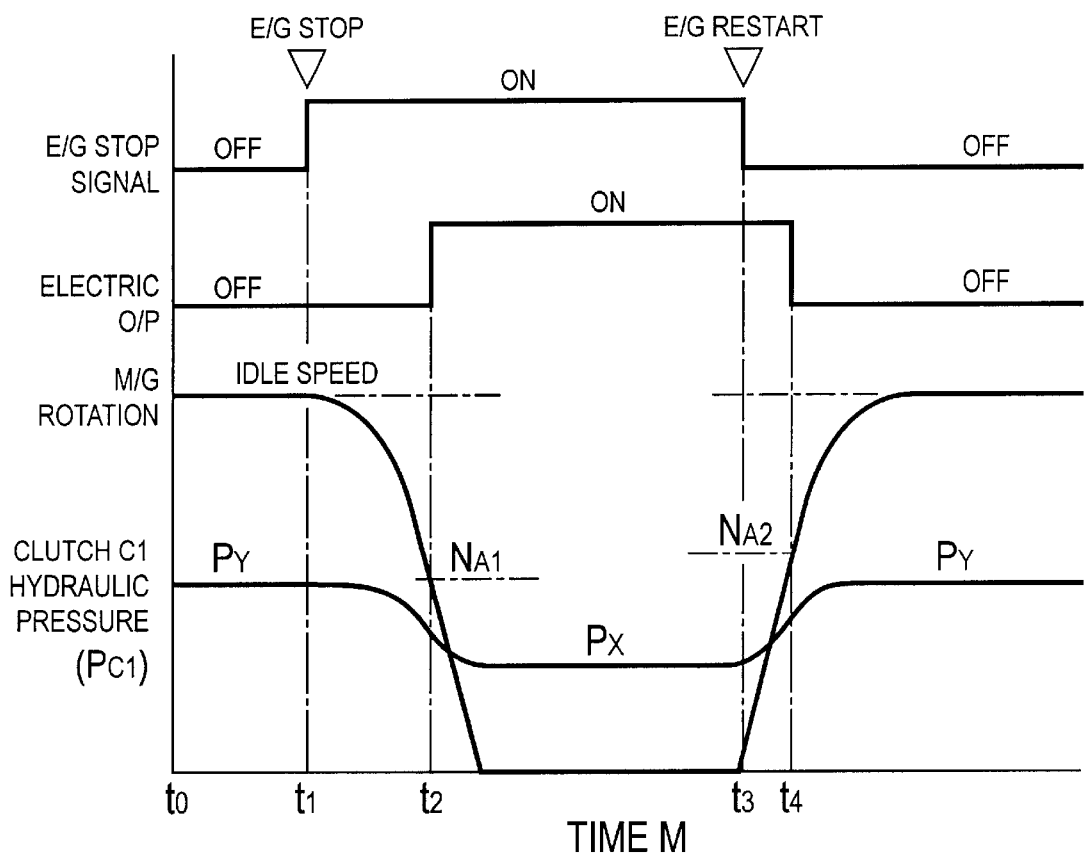
Figure 6B:
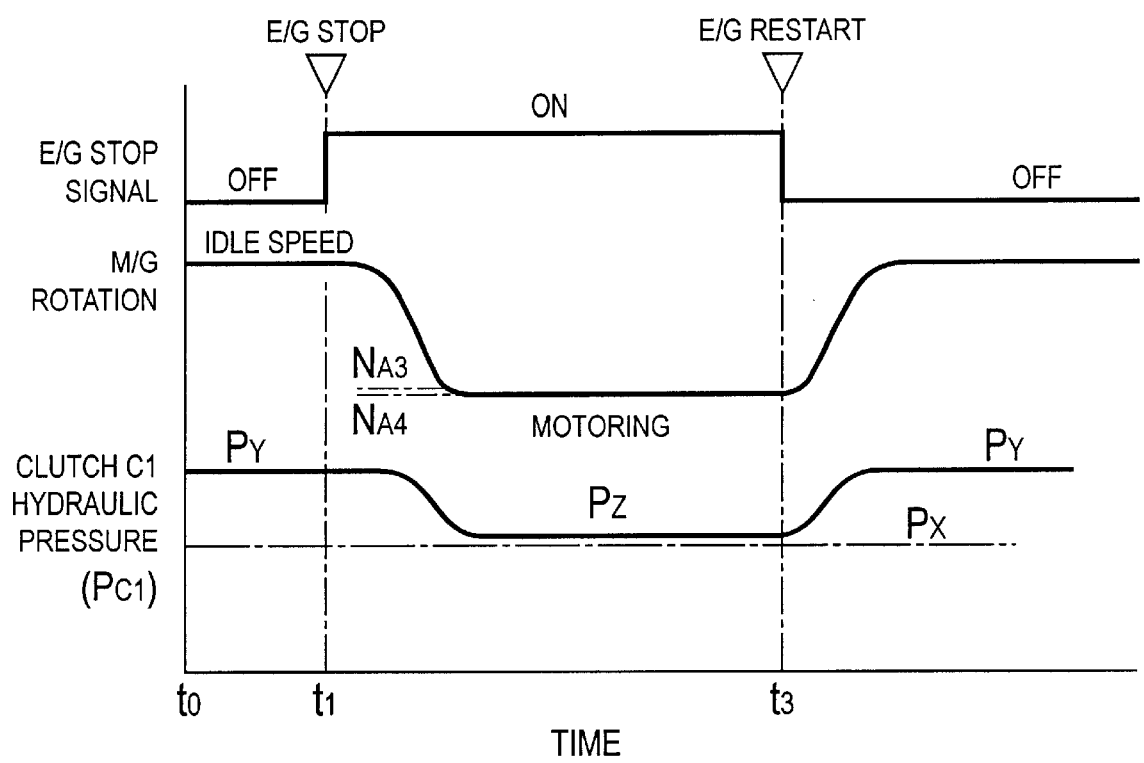

Next, a description will be given on a drive control of the electric oil pump 11 together with the drive control of the driving source 2 in an automatic stop control of the engine 5. FIG. 6-1 is a view which describes one example of the drive control of the motor generator 6 (that is, the mechanical oil pump 10) and the electric oil pump 11 in the case that the AT oil temperature is within a predetermined usable temperature range of the electric oil pump 11 ($T_{MIN}$<AT oil temperature <$T_{MAX}$: $T_{MIN}$ is a minimum set temperature and $T_{MAX}$ is a maximum set temperature), in the driving control device of the vehicle according to this embodiment.

As shown in FIG. 6-1, a stop flag of the driving source 2 is set to "off" at a timing to. In the stop flag "off" of the driving source 2, the engine 5 and the motor generator 6 are driven at an idle speed of the engine 5, and the mechanical oil pump 10 is driven. The driving of the mechanical oil pump 10 maintains the hydraulic pressure PC1 of the clutch C1 supplied to the hydraulic control device 9 of the automatic transmission 3 is maintained in an approximately fixed hydraulic pressure $P_Y$. This hydraulic pressure $P_{C1}$ of the clutch C1 corresponds to a hydraulic pressure of the forward clutch C1 mentioned above which is engaged at a time of starting. In this timing $t_0$, the working voltage V supplied to the electric oil pump 11 is 0, and the electric oil pump 11 stops.

In a timing $t_1$, the stop flag of the driving source 2 is set to "on" as shown in FIG. 6-1, the engine stop control is started, and the driving of both of the engine 5 and the motor generator 6 is stopped. Immediately after the engine stop control is started, the rotation of the engine 5 and the motor generator 6 does not immediately stop, and the rotation of the motor generator 6 is gradually reduced. Accordingly, the rotations of the engine 5 and the mechanical oil pump 10 are gradually reduced. When the rotation of the motor generator 6 is reduced, and the engine speed detector 13g detects that the engine speed $N_E$ becomes a first set speed $N_{A1}$ on the basis of the detection signal from the engine speed sensor 17 in a timing $t_2$, the electric oil pump drive control and fail detector 13d detects that the electric oil pump 11 does not fail, refers to the map M as shown in FIG. 5b on the basis of the oil temperature T detected by the oil temperature detector 13b, computes the working voltage V in correspondence to the detected oil temperature T, and supplies the computed working voltage V to the electric oil pump 11 by means of a duty control. Accordingly, the electric oil pump 11 is driven.

In this case, when the battery voltage of the battery 12 is changed, for example, due to the change in charging amount of the battery 12, during supplying the working voltage V to the electric oil pump 11, the battery detector 13h detects the change in the battery voltage, refers to the map M shown in FIG. 5b, and duty controls the battery voltage so as to achieve the working voltage V (for example, $V_A$, $V_B$, $V_C$ and the like) of the electric oil pump 11 corresponding to the oil temperature T. Therefore, even when the battery voltage is changed, the hydraulic pressure is securely supplied by the electric oil pump 11, and the minimum hydraulic pressure Px required for engaging the forward clutch C1 can be stably maintained without relation to the magnitude of the battery voltage.

Further, for example, when the oil temperature is a low oil temperature $T_C$ such as the case that the engine 5 is stopped immediately after being started, the working voltage $V_C$ shown in FIG. 5b is supplied. Further, for example, when the oil temperature is increased due to the heat of the torque converter 7 or the like and is the higher oil temperature $T_B$ than the oil temperature $T_C$, the working voltage $V_B$ higher than the working voltage $V_C$ is supplied as shown in FIG. 5b, and when the oil temperature is further increased and is the higher oil temperature $T_A$ than the oil temperature $T_B$, the working voltage $V_A$ higher than the working voltage $V_B$ is supplied as shown in FIG. 5b.

Therefore, the electric oil pump 11 is driven and controlled, and the hydraulic pressure is supplied by the electric oil pump 11, whereby the hydraulic pressure of the hydraulic control device 6 is maintained in the minimum hydraulic pressure Px required for engaging the forward clutch C1.

Accordingly, without relation to the change in the oil temperature T, it is possible to prevent the hydraulic pressure from being generated while supplying the hydraulic pressure Px required for reengaging the forward clutch C1 as the hydraulic pressure $P_{C1}$ of the clutch C1, and it is possible to reduce the load of the electric oil pump 11. Therefore, it is possible to increase a working time by reducing the consumed power of the electric motor M1 in the electric oil pump 11 so as to restrict the reduction of the charging amount of the battery 12, and it is possible to improve a durability of the electric oil pump 111 and the electric motor M1. Further, since the load of the electric oil pump 11 is reduced, it is possible to downsize the electric oil pump 11. Further, for example, in the hybrid vehicle, since it is possible to reduce the consumed power as mentioned above, it is possible to increase a driving time of the motor generator 6, and accordingly it is possible to improve the fuel economy and it is possible to reduce the exhaust gas.

In the manner mentioned above, the hydraulic pressure $P_{C1}$ of the clutch C1 can be maintained in the approximately fixed hydraulic pressure minimum required for controlling the hydraulic pressure of the automatic transmission 3, that is, the hydraulic pressure Px minimum required for engaging the forward clutch C1, as shown in FIG. 6-1.

In this case, for example, when driving the electric oil pump 11 in a state in which the residual hydraulic pressure is high by the mechanical oil pump 10, the load is generated in the electric oil pump 11, and for example, when driving the electric oil pump 11 after the residual oil pressure is lost by the mechanical oil pump 10, the hydraulic pressure PC1 of the clutch C1 becomes lower than the hydraulic pressure Px required for the hydraulic pressure control. Then, a threshold value to start the supply of the working voltage V to the electric oil pump 11 is set to such predetermined value that the residual hydraulic pressure is sufficiently reduced by the mechanical oil pump 10 and the hydraulic pressure $P_{C1}$ of the clutch C1 can maintain the hydraulic pressure Px.

In the state in which the engine speed becomes 0 and the hydraulic pressure $P_{C1}$ of the clutch C1 is maintained in the hydraulic pressure Px, it is possible to prevent a so-called hunting in which the electric oil pump 11 erroneously stops and restarts from being generated.

When a restart condition of the engine 5 is established in the timing t3, and the stop flag of the driving source 2 is turned off, an engine restarting control is started. Therefore, the motor generator 6 is driven, and the engine 5 and the mechanical oil pump 10 are rotated. The hydraulic pressure is generated by the rotation of the mechanical oil pump 10.

However, a rising of the hydraulic pressure by the mechanical oil pump 10 causes a delay at a predetermined time due to the resistance of the hydraulic circuit or the like as shown in FIG. 6-1.

Meanwhile, since the working voltage V is also supplied to the electric oil pump 11 after the timing t3, the hydraulic pressure Px from the electric oil pump 11 is continuously supplied to the hydraulic control device 9. Accordingly, together with the driving of the mechanical oil pump 10 and the driving of the electric oil pump 11, the hydraulic pressure $P_{C1}$ of the clutch C1 starts rising up higher than the hydraulic pressure $P_{C1}$. Further, when the engine speed $N_E$ becomes a second set speed $N_{A2}$ ($N_{A2}>N_{A1}$) at a timing $t_4$, the working voltage V supplied to the electric oil pump 11 becomes 0, and the electric oil pump 11 is stopped. Thereafter, the hydraulic pressure is supplied by only the mechanical oil pump 10.

In the rotation of the engine 5 by driving the motor generator 6, when the engine speed $N_E$ rises up to near the idle speed, the engine 5 is restarted, the engine speed $N_E$ becomes the idle speed, and the hydraulic pressure $P_{C1}$ of the clutch C1 becomes finally the hydraulic pressure $P_Y$ at a time of the idle rotation and becomes a hydraulic pressure in a normal traveling state. Then, the vehicle starts on the basis of the driving force of the engine 5, and travels.

In this case, for example, when the engine 5 is restarted and the driving of the electric oil pump 11 is stopped, there is a risk that the rising of the discharge pressure of the mechanical oil pump 10 causes a delay and the hydraulic pressure $P_{C1}$ of the clutch C1 becomes lower than the hydraulic pressure Px required for controlling the hydraulic pressure of the automatic transmission 3. Then, the second set speed $N_{A2}$ of the engine speed $N_E$ is set so as to stop the electric oil pump 11 at a time when the hydraulic pressure by the mechanical oil pump 10 rises up to such a level as to maintain the required hydraulic pressure Px.

Figure 7:
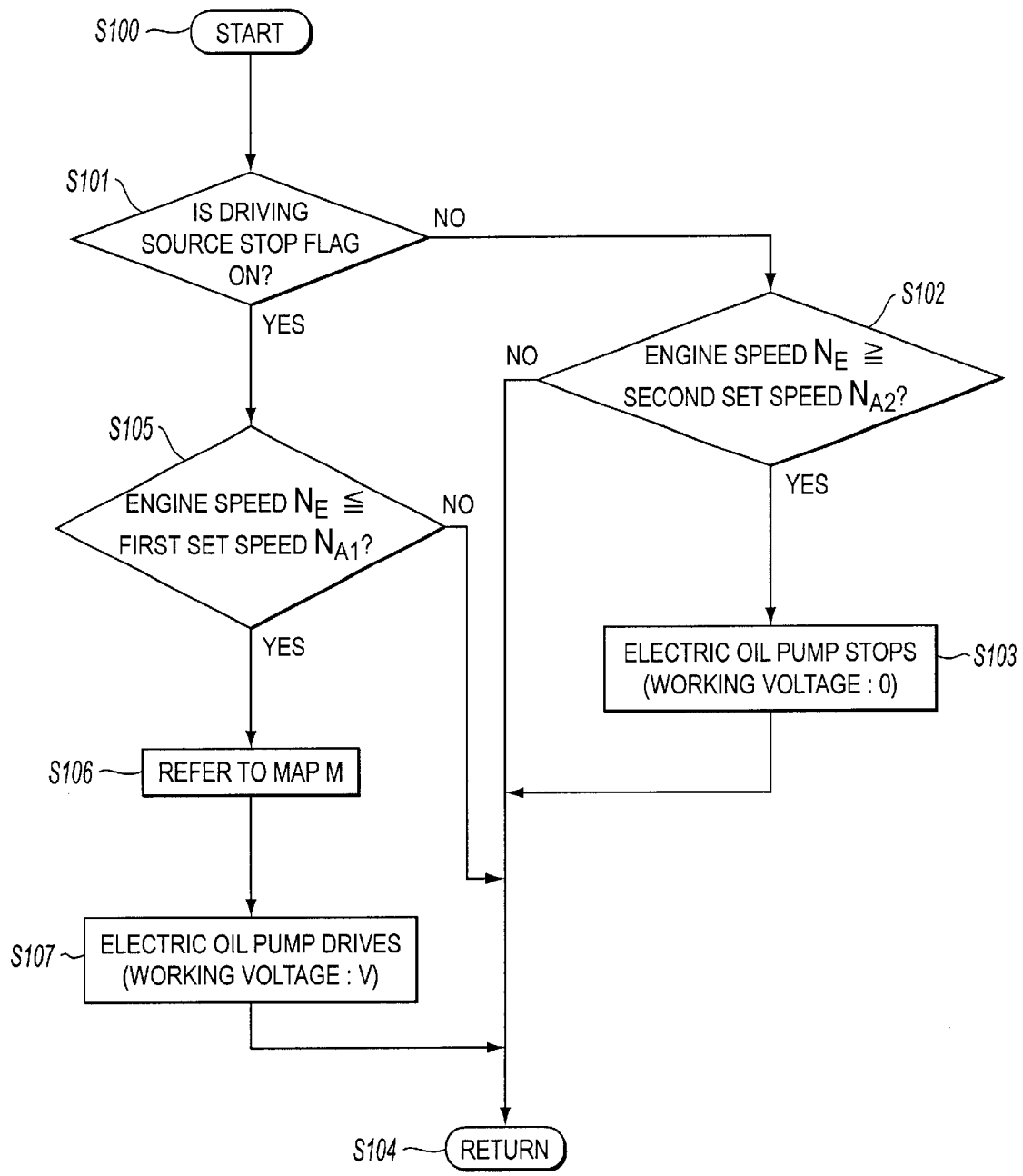
FIG. 7 is a flow chart for driving and controlling the electric oil pump shown in FIG. 6.

Next, a description will be given on a flow for driving controlling the electric oil pump 11 as mentioned above. FIG. 7 is a view showing a flow for driving control of the electric oil pump 11. As shown in FIG. 7, the driving control of the electric oil pump 11 is started in step S100, for example, by a driver turning on an ignition switch by using an ignition key (not shown). The driving control of the electric oil pump 11 is executed by the electric oil pump drive control and fail detector 13d of the controller 13, and can be continued until the ignition switch is turned off.

First, it is judged in step S101 on the basis of a throttle opening or the like whether the stop flag of the driving source 2 is in an on state. Under a state in which the vehicle is, for example, in a normal traveling state or the like and the engine 5 and the motor generator 6 are driven, when it is judged in step S101 that the stop flag of the driving source 2 is not in the on state, that is, the stop flag of the driving source 2 is in an off state, it is judged in step S102 by the engine speed detector 13g on the basis of the engine speed detection signal from the engine speed sensor 17 whether the engine speed $N_E$ is equal to or more than the second set speed $N_{A2}$.

When it is judged that the engine speed $N_E$ is equal to or more than the second set speed $N_{A2}$, the routine is returned in step S104 in a state in which the electric oil pump 11 is stopped in step S103 by the electric oil pump drive control and fail detector 13d (the working voltage 0), the routine is returned to the start in step S1000, and the processes at step S100 and thereafter are repeated.

Further, when it is judged in step S102 that the engine speed $N_E$ is not equal to or more than the second set speed $N_{A2}$, the routine is returned as it is in step S104 and returned to the start in step S100, and the processes after step S100 are repeated.

When it is judged in step S101 that the stop flag of the driving source 2 is in the on state, the engine stop control is started, and the driving of the engine 5 and the motor generator 6 is stopped. Next, it is judged in step S105 whether the engine speed $N_E$ is equal to or less than the first set speed $N_{A1}$. Since the speed of the motor generator 6 is gradually reduced immediately after being controlled so that the driving of each of the engine 5 and the motor generator 6 is stopped, the mechanical oil pump 10 is gradually reduced, so that it is judged in step S105 that the engine speed $N_E$ is not equal to or less than the first set speed $N_{A1}$. At this time, the hydraulic pressure applied by the mechanical oil pump 10 is gradually reduced. Then, the routine is returned in step S104 in a state in which the electric oil pump 11 is stopped by the electric oil pump drive control and fail detector 13d, and returned to the start of step S100, and the processes after step S100 are repeated.

When the motor generator speed is significantly reduced, and it is judged in step S105 that the engine speed $N_E$ is equal to or less than the first set speed $N_{A1}$, the working voltage V is computed in step S106 with reference to the map M on the basis of the oil temperature T detected by the oil temperature detector 13b. Further, in step S107, the computed working voltage V is supplied to the electric oil pump 11 by means of the duty control by the electric oil pump drive control and fail detector 13d. Accordingly, the electric pump 11 is driven, and the hydraulic pressure is supplied to the hydraulic control device 9 on the basis of the computed working voltage V.

In this case, the driving control of the electric oil pump 11 in accordance with the driving control of the driving source 2 mentioned above is executed in the case of executing the automatic stop of the engine 5 at a time when the electric oil pump 11 is normal, and for example, the AT oil temperature is within the predetermined usable temperature range of the electric oil pump 11 ($T_{MIN}$<AT oil temperature <$T_{MAX}$: $T_{MIN}$ is the minimum set temperature and $T_{MAX}$ is the maximum set temperature), and the hydraulic pressure is supplied to the hydraulic control device 9 by the electric oil pump 11. In this case, in the control device of the automatic transmission in this embodiment, the mechanical oil pump 10 and the electric oil pump 11 are driven and controlled in the following manner. A description will be in more detail given below of the driving control device of the engine 5 and the motor generator 6 driving the mechanical oil pump 10 in the case that the electric oil pump 11 is usable in the driving control device of the vehicle according to this embodiment, with reference to FIG. 6-1.

As shown in FIG. 6-1, in the driving control of the motor generator 6 (that is, the driving control of the engine 5) and the driving control of the electric oil pump 11 according to this embodiment, an engine stop condition is established at a time when a predetermined time has passed after the brake pedal is stepped down, for example, due to the signal stop in the intersection, the vehicle stops and the speed of the engine 5 becomes the idle speed of the engine 5 or the speed near the idle speed (hereinafter, the description is given on the basis of the idle speed). At this time, the electric oil pump 11 stops.

Then, the engine (E/G) stop signal is output, the engine stop control is started, and the motor generator 6 is automatically stopped by the motor generator target speed set and drive controller 13e. The engine 5 and the mechanical oil pump 10 are stopped by means of the automatic stop of the motor generator 6. Then, the rotation (M/G rotation) of the motor generator 6 is gradually reduced from the idle speed together with the speed $N_E$ of the engine 5. Further, when the rotations of the engine 5 and the motor generator 6 are going to be reduced, and it is detected by the engine speed detector 13g that the engine speed $N_E$ becomes the first set speed $N_{A1}$, the electric oil pump 11 is driven by the electric oil pump drive control and fail detector 13d.

Since the speed of the mechanical oil pump 10 is reduced in accordance with the reduction in rotation of the motor generator 6, the hydraulic pressure $P_{C1}$ of the forward clutch C1 is reduced from the hydraulic pressure $P_Y$ at a time of the idle speed. However, since the hydraulic pressure by the electric oil pump 11 is supplied as the hydraulic pressure $P_{C1}$ of the clutch C1 by the electric oil pump 11 being driven, the hydraulic pressure $P_{C1}$ of the clutch C1 is gradually and gently reduced by the hydraulic pressure supply by the electric oil pump 11 in addition to the reduced hydraulic pressure supply by the mechanical oil pump 10.

About that time when the rotations of the engine 5 and the motor generator 6 stop, the hydraulic pressure $P_{C1}$ of the clutch C1 becomes the hydraulic pressure applied only by the hydraulic pressure of the electric oil pump 11, and becomes an approximately fixed hydraulic pressure Px which is the minimum required pressure for engaging the forward clutch C1. Thereafter, the electric oil pump 11 remains driven, and the hydraulic pressure $P_{C1}$ of the clutch C1 is maintained in the approximately fixed hydraulic pressure Px (corresponding to the predetermined hydraulic pressure of the present invention).

When the engine restarting condition is established in this state, the engine stop signal stops, and the engine restarting control is started. The motor generator 6 is driven by means of the start of the engine restarting control, the engine 5 is rotated by the driving of the motor generator 6, and the mechanical pump 11 is again driven. The hydraulic pressure is supplied from the mechanical pump 11 by means of the restarting of the mechanical pump 11, whereby the hydraulic pressure $P_{C1}$ of the clutch C1 starts gradually rising from the hydraulic pressure Px.

When the engine speed $N_E$ is increased, and it is detected by the engine speed detector 13g that the engine speed $N_E$ becomes the second set speed $N_{A2}$, the electric oil pump 11 is stopped by the electric oil pump drive control and fail detector 13d. Accordingly, the hydraulic pressure $P_{C1}$ of the clutch C1 becomes the hydraulic pressure applied only by the mechanical oil pump 10. Further, at a timing when the engine speed $N_E$ becomes the second set speed $N_{A2}$, the hydraulic pressure $P_{C1}$ of the clutch C1 is close to the hydraulic pressure $P_Y$ at a time of the idle speed. When the engine 5 is rotated near the idle speed by the driving of the motor generator 6, the engine 5 and the motor generator 6 are driven at the idle speed after the engine 5 is restarted, and then the hydraulic pressure $P_{C1}$ of the clutch C1 becomes the hydraulic pressure $P_Y$ at a time of the idle speed.

On the other hand, a description will be given on the driving control of the motor generator 6 in the case that the electric oil pump 11 can not be driven outside the condition in which the electric oil pump 11 can be driven for the reason that the AT oil temperature becomes out of the usable temperature range of the electric oil pump 11 (AT oil temperature<$T_{MIN}$, or AT oil temperature>$T_{MAX}$) or the electric oil pump 11 fails.

FIG. 6-2 is a view showing one example of the driving control of the mechanical oil pump 10 in the case that the AT oil temperature is out of the usable temperature range of the electric oil pump 11 and the electric oil pump 11 can not be driven in the driving control device of the vehicle according to this embodiment, and describing the driving control of the motor generator 6 corresponding to the driving source of the mechanical oil pump 10.

As shown in FIG. 6-2, according to the driving control of the motor generator 6 of this example, in the same manner as that of the case that the electric oil pump 11 can be used, when the engine stop condition is established in a state in which the engine 5 and the motor generator 6 are driven at the idle speed, and the electric oil pump 11 stops, the engine (E/G) stop signal is output. Accordingly, the engine stop control is started, the driving of the motor generator 6 is stopped and the driving of the engine 5 is stopped, whereby the rotation of the motor generator 6 is reduced, and the engine speed $N_E$ is gradually reduced from the idle speed. Therefore, since the speed of the mechanical oil pump 10 is reduced, the hydraulic pressure supplied to the hydraulic control device 9 from the mechanical oil pump 10 is reduced, and the hydraulic pressure $P_{C1}$ of the forward clutch C1 is also reduced.

When it is detected by the engine speed detector 13g that the engine speed $N_E$ becomes the third set speed $N_{A3}$, the motor generator (M/G) 6 is driven (motored) by the motor generator target speed set and drive controller 13e at a predetermined speed $N_{A4}$ which is equal to or slightly smaller than the third set speed $N_{A3}$. In this case, the first and second set speeds $N_{A1}$ and $N_{A2}$ mentioned above are set smaller than the predetermined speed $N_{A4}$ at the motoring time ($N_{A1}$, $N_{A2}$<$N_{A4}$). Accordingly, at the motoring time by the motor generator 6, the electric oil pump 11 is not driven.

The mechanical oil pump 10 is driven by the motoring of the motor generator 6, and the hydraulic pressure is supplied to the hydraulic control device 9 by the mechanical oil pump 10, and the reduction in the hydraulic pressure $P_{C1}$ of the forward clutch C1 is inhibited.

Further, the speed of the motor generator 6 at the motoring time is controlled constant to the predetermined speed $N_{A4}$ by the motor generator target speed set and drive controller 13e on the basis of the speed detected by the motor generator speed detector 13f. Accordingly, the engine speed $N_E$ at this time is also kept constant to the predetermined speed $N_{A4}$, however, the predetermined speed $N_{A4}$ is set to a speed other than the speed near the resonance point of the engine 5.

Further, since the speed of the mechanical oil pump 10 is also maintained constant to the predetermined speed $N_{A4}$ by keeping the speed $N_E$ of the motor generator 6 constant, the hydraulic pressure $P_{C1}$ of the forward clutch C1 is maintained to a constant predetermined hydraulic pressure PZ. The predetermined hydraulic pressure PZ is set to a hydraulic pressure equal to or larger than the hydraulic pressure Px which is minimum required for controlling the hydraulic pressure of the automatic transmission 3 (in this embodiment, set to a hydraulic pressure which is a slightly larger than the hydraulic pressure Px).

In this state, when the engine restarting condition is established, the output of the engine stop signal is stopped, and the engine restarting control is started. Since the rotation of the motor generator 6 is accordingly increased, the engine speed $N_E$ is also increased, and the speed of the mechanical oil pump 10 is also increased.

And, when the rotation of the motor generator 6 is increased, whereby the engine speed $N_E$ is gradually increased up to near the engine idle speed, the engine 5 is started, and thereafter, the speed $N_E$ of the engine 5 becomes the idle speed. Then, the motor generator 6 is rotated at the idle speed, and the mechanical oil pump 10 is going to be rotated at the same speed. Accordingly, the working fluid supplied to the hydraulic control device 9 from the mechanical oil pump 10 is increased, the hydraulic pressure is increased, and the hydraulic pressure $P_{C1}$ of the forward clutch C1 is set to the hydraulic pressure $P_Y$ at a time of the idle speed.

In this case, in the example shown in FIG. 6-2 mentioned above, the description is given on the case that the AT oil temperature becomes out of the usable temperature range of the electric oil pump 11 and the electric oil pump 11 can not be driven at a time when the electric oil pump 11 is normal and not driven, however, the driving control of the engine 5 (that is, the driving control of the mechanical oil pump 10) can be also executed in the same manner in the case that the AT oil temperature is out of the usable temperature range of the electric oil pump 11 during the electric oil pump 11 being normal and driven. Further, in the case that the electric oil pump 11 fails so as to be incapable of being driven even when the AT oil temperature is within the usable temperature range of the electric oil pump 11, the driving control of the engine 5 can be executed in the same manner.

Further, in the example shown in FIG. 6-2 mentioned above, the time when the electric oil pump 11 can not be driven is set to the time when the AT oil temperature is out of the usable temperature range of the electric oil pump 11 mentioned above (the time when the AT oil temperature satisfies the relation AT oil temperature<$T_{MIN}$ or AT oil temperature>$T_{MAX}$). However, the time when the electric oil pump 11 can not be driven includes every time when the electric oil pump 11 can not be driven, for example, the fail time of the electric oil pump 11 and the like. Here, in this case, even when the electric oil pump 11 is out of the usable temperature range, the electric oil pump 11 can be driven. However, there is a problem in view of normally using the electric oil pump 11. Accordingly, this time is included in the time when the electric oil pump 11 can not be driven.

Figure 8:
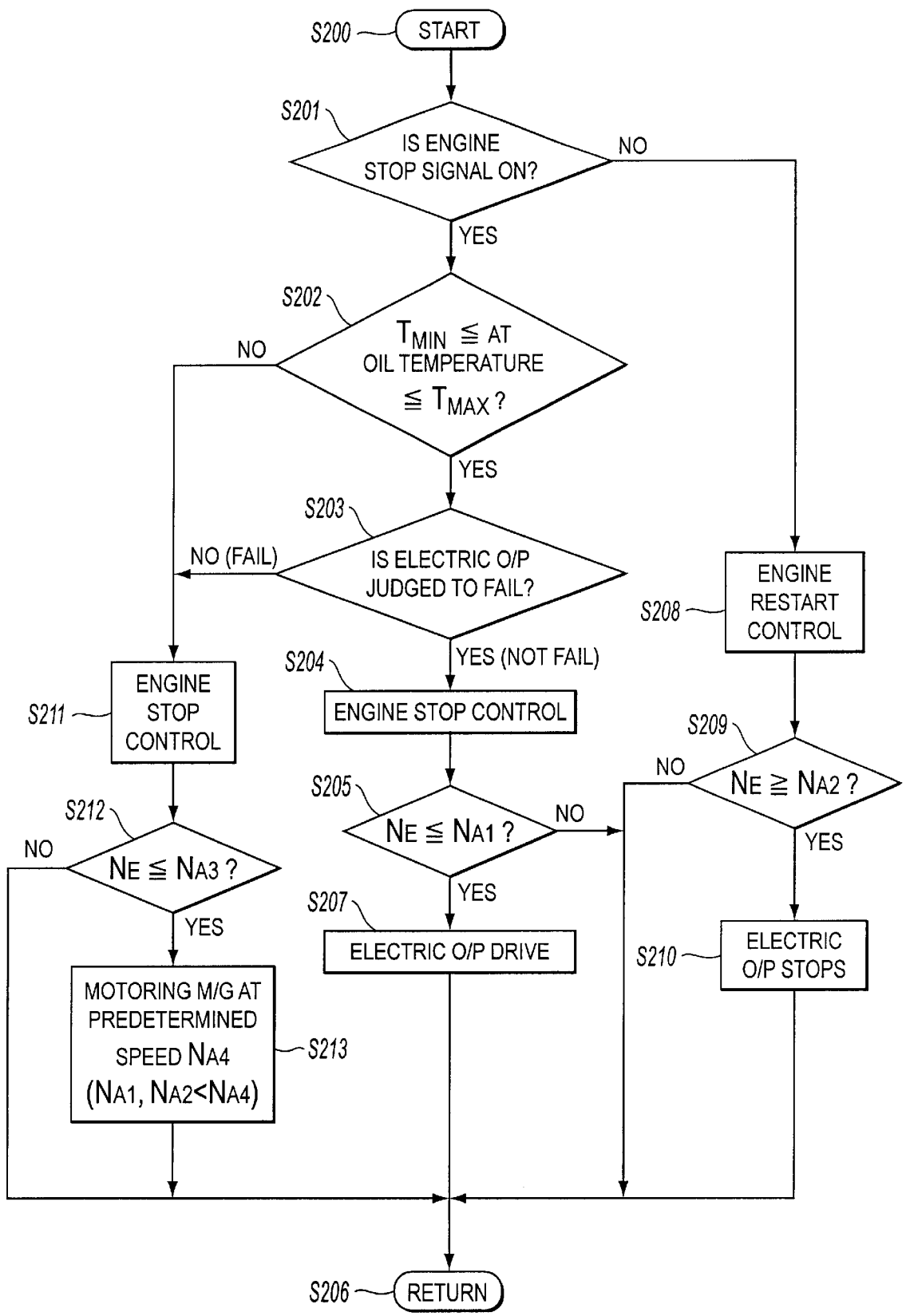
FIG. 8 is a flow chart for driving and controlling the engine shown in FIG. 6.

Next, a description will be given on a flow chart for driving controlling the mechanical oil pump 10 shown in FIGS. 6-1 and 6-2. FIG. 8 is a view showing a flow chart for driving controlling the mechanical oil pump 10. As shown in FIG. 8, the driving control of the mechanical oil pump 11 is started in step S200, for example, by the driver turning on the ignition switch by using the ignition key (not shown). The driving control of the mechanical oil pump 11 is executed by the controller 13, and is kept until the ignition switch is turned off.

First, it is judged in step S201 whether the engine stop signal is output. If it is judged that the engine stop signal is output, it is judged in step S202 whether the AT oil temperature is equal to or more than the minimum set temperature $T_{MIN}$ and equal to or less than the maximum set temperature $T_{MAX}$ ($T_{MIN}$<AT oil temperature<$T_{MAX}$). If it is judged that the AT oil temperature satisfies the relation $T_{MIN}$<AT oil temperature<$T_{MAX}$, it is judged in step S203 by the electric oil pump drive control and fail detector 13d whether the electric oil pump 11 fails.

If it is judged that the electric oil pump 11 does not fail, the engine stop control is started in step S204, the driving of each of the motor generator 6 and the engine 5 is stopped, and the speeds of the motor generator 6 and the engine 5 are naturally reduced. Next, it is judged in step S205 whether the engine speed (=the speed of the motor generator 6) $N_E$ is equal to or less than the first set speed $N_{A1}$ ($N_E$<$N_{A1}$).

If it is judged that the engine speed $N_E$ does not satisfy the relation $N_E$<$N_{A1}$, the routine is returned as it is in step S206 and goes to the start in step S200, and the processes after step S201 are repeated. Further, it is judged that the motor generator speed $N_E$ satisfies the relation $N_E$<$N_{A1}$, the electric oil pump 11 is driven in step S207, thereafter the routine is returned to the start of step S200 in step S206, and the processes after step S201 are repeated.

If it is judged in step S201 that the engine stop signal is not output during the engine 5 being driven at the idle speed, an engine restarting control is started in step S208. Accordingly, the motor generator 6 is driven, and the engine 5 is restarted. Next, it is judged in step S209 whether the engine speed $N_E$ is equal to or more than the second set speed $N_{A2}$ ($N_E$>$N_{A2}$).

If it is judged that the engine speed $N_E$ does not satisfy the relation $N_E$>$N_{A2}$, the routine is returned as it is in step S206 and goes to the start of step S200, and the processes after step S201 are repeated. Further, if it is judged that the engine speed $N_E$ satisfies the relation $N_E$>$N_{A2}$, the driving of the electric oil pump 11 is stopped in step S210, thereafter the routine is returned in step S206 in the same manner and goes to the start of step S200, and the processes after step S201 are repeated.

If it is judged in step S202 that the AT oil temperature is not equal to or more than the minimum set temperature $T_{MIN}$ and not equal to or less than $T_{MAX}$ ($T_{MIN}$<oil temperature<$T_{MAX}$), that is, satisfies the relation AT oil temperature<$T_{MIN}$ or AT oil temperature>$T_{MAX}$, the engine stop control is started in step S211, the driving of each of the motor generator 6 and the engine 5 is stopped, and each of the speeds of the motor generator 6 and the engine 5 is reduced. Next, it is judged in step S212 whether the engine speed $N_E$ is equal to or less than the third set speed $N_{A3}$ ($N_E$<$N_{A3}$).

If it is judged that the engine speed $N_E$ does not satisfy the relation $N_E$<$N_{A3}$, step goes to the start of step S200 via the return of step S206, and the processes after step S201 are repeated. Further, if it is judged that the engine speed $N_E$ satisfies the relation $N_E$<$N_{A3}$, the motor generator 6 is driven and the motoring is executed at the predetermined speed $N_{A4}$ ($N_{A4}$>$N_{A1}$, $N_{A2}$) in step S213. Thereafter, step goes to the start of step S200 via the return of step S206, and the processes after step S201 are repeated.

If it is judged that the engine stop signal is not output in step S201 during the motoring of the motor generator 6, the engine restarting control is started in step S208 in the same manner as mentioned above. Accordingly, the motoring by the motor generator 6 is stopped, and the speed of the motor generator 6 (that is, the engine speed $N_E$) is increased. Next, the judging process of judging whether the engine speed $N_E$ is equal to or more than the second set speed $N_{A2}$ ($N_E$>$N_{A2}$) is executed in step S209 in the same manner as mentioned above. However, since the engine speed $N_E$ is equal to or more than the predetermined speed $N_{A4}$ at this time, that is, more than the second set speed $N_{A2}$, it is judged that the relation $N_E$>$N_{A2}$ is established.

Accordingly, step goes to step S210, however, in the case that the engine restarting control is started during the motoring of the motor generator 6, the electric oil pump 11 is not driven, so that step goes to the start of step S200 via the return of step S206 through step S210 as it is, and the processes after step S201 are repeated.

Further, if it is judged in step S203 that the electric oil pump 11 fails, step goes to step S211, and the processes after step S211 are executed in the same manner as mentioned above.

In the manner mentioned above, according to the driving control device of the vehicle of this embodiment, when the mechanical oil pump 10 is stopped on the basis of the automatic stop control of the engine 5 in the state in which the ATF of the automatic transmission 3 is in the oil temperature at the normal use corresponding to the usable range of the electric oil pump 11 and in the state in which the electric oil pump 11 is normal, the hydraulic pressure of the hydraulic control device 9 can be maintained, for example, in the hydraulic pressure Px required for engaging the forward clutch C1 which is engaged at the restarting time of the motor generator 6 (the engine 5) and the starting time, owing to the hydraulic pressure supplied by the electric oil pump 11. Accordingly, it is possible to prevent the shock from being generated at a time of reengaging the forward clutch C1.

Further, since the mechanical pump 10 is driven by the motoring of the motor generator 6 even in the state in which the oil temperature of the ATF of the automatic transmission 3 is out of the usable oil temperature range of the electric oil pump 11 or in the state in which the electric oil pump 11 fails, it is possible to maintain the hydraulic pressure of the hydraulic control device 9 equal to or more than the predetermined hydraulic pressure Px. Accordingly, it is possible to prevent the shock from being generated at a time of reengaging the forward clutch C1.

In particular, since the hydraulic pressure Px maintained by the hydraulic control device 9 at a time of restarting the motor generator 6 (the engine 5) is set to the hydraulic pressure required for engaging the forward clutch C1, it is possible to securely engage the forward clutch C1 without generating any uncomfortable shock at a time of starting the vehicle after restarting the engine 5. Therefore, it is possible to smoothly restart the vehicle.

Further, at a time of the low oil temperature or the high oil temperature of the AT oil temperature, or at the failing time of the electric pump, since the hydraulic pressure Px mentioned above is supplied to the hydraulic control device 9 by the mechanical pump 10 by not completely setting the engine speed $N_E$ to 0 at the engine stop control time but keeping the engine speed $N_E$ in the predetermined speed lower than the idle speed, an energy efficiency against the fuel is improved, and it is possible to achieve a low consumed energy and reduce an exhaust gas.

In this case, since the engine speed $N_E$ by the motor generator 6 is set to the speed other than the resonance point of the engine 5, the engine 5 does not resonate. Accordingly, it is possible to stably restart the engine 5.

Further, when the AT oil temperature is the low oil temperature lower than the oil temperature at the normal use time or the high oil temperature higher than the oil temperature at the normal time, a working frequency of the electric oil pump 11 is generally small. However, since the structure is made such that the electric oil pump 11 does not work in the temperature range of the AT oil temperature, it is not necessary to increase the size of the electric oil pump 11. Therefore, it is possible to reduce the cost in addition that it is possible to increase a degree of freedom in mounting the electric oil pump 11.

Further, even in the case of executing the engine automatic stop control at a time of the high oil temperature of the AT oil temperature, since the engine 5 is driven by the motor generator 6, a conventionally well known cooling device (not shown) is driven together with the driving of the engine 5. Therefore, a cooling function of the cooling device is maintained, and it is possible to prevent the ATF from being deteriorated, and it is possible to prevent a durability of the friction material of the frictional engagement element from being reduced.

In this case, the structure is made such that the forward clutch C1 engaging at the starting time is employed as the frictional engagement element mentioned above, however, the invention can be applied to the other frictional engagement elements. However, it is preferable to apply the invention to the frictional engagement element which is engaged at the starting time.

In accordance with the driving control device of the vehicle according to the invention structured in the manner mentioned above, since the oil is supplied to the hydraulic control device by the electric oil pump at a time when the mechanical oil pump is stopped in accordance with the automatic stop control of the engine in a state in which the electric oil pump can be used, it is possible to maintain the hydraulic pressure of the hydraulic control device in the predetermined hydraulic pressure, and it is possible to prevent the shock from being generated at a time of reengaging the frictional engagement element.

Further, when the electric oil pump can not be driven in the automatic stop control of the engine, it is possible to maintain the hydraulic pressure of the hydraulic control device equal to or more than the predetermined hydraulic pressure by supplying the oil to the hydraulic control device by the mechanical pump driven by the motor. Accordingly, it is possible to prevent the shock from being generated at a time of reengaging the frictional engagement element.

In particular, according to another exemplary aspect of the invention, it is possible to supply the oil to the hydraulic control device by driving the motor at the predetermined speed so as to drive the mechanical oil pump in the temperature range in which the oil temperature of the working fluid of the automatic transmission is the low oil temperature lower than the oil temperature at the normal use or the high oil temperature higher than the oil temperature at the normal use, or in the fail time of the electric oil pump, whereby it is possible to maintain the hydraulic pressure of the hydraulic control device equal to or more than the predetermined hydraulic pressure.

When the working fluid of the automatic transmission is at the low oil temperature or the high oil temperature, a working frequency of the electric oil pump is generally small. However, since the structure is made such that the electric oil pump does not work in the temperature range of the working fluid, it is not necessary to increase the size of the electric oil pump. Accordingly, it is possible to increase a degree of freedom in mounting the electric oil pump and also to reduce a cost.

When the oil temperature of the working fluid is at the low oil temperature or the high oil temperature, the oil is supplied to the hydraulic control device by the mechanical pump by keeping the engine speed at the predetermined speed which is lower than an idle speed, at a time of the automatic stop control of the engine, so that an energy efficiency with respect to the fuel is improved, and it is possible to reduce a consumption energy and the exhaust gas.

Further, since the motor is driven even in the case of executing the automatic stop control of the engine at a time when the working fluid is at the high oil temperature, a cooling function of a cooling device can be kept by driving the cooling device corresponding to the driving of the motor, and it is possible to prevent the working fluid from being deteriorated and prevent a durability of a frictional material in the frictional engagement element from being reduced.

According to another exemplary aspect of the invention, a motor generator starting the engine is at least driven, whereby it is possible to supply the oil to the hydraulic control device by the mechanical pump by means of the driving force of the motor generator at a time when the electric oil pump can not be driven, and it is possible to maintain the hydraulic pressure of the hydraulic control device equal to or more than the predetermined hydraulic pressure.

Further, according to another exemplary aspect of the invention, since the predetermined speed mentioned above is set to the higher speed than the resonance point of the engine, the engine corresponding to the driving source rotates at the predetermined speed, and the engine does not resonate. Accordingly, it is possible to stably restart the engine.

According to another exemplary aspect of the invention, when the electric oil pump can not be driven at a time of the engine automatic stop control, the predetermined speed of the mechanical oil pump caused by a motoring of the motor is set to be larger than the first and second set speeds of the engine corresponding to a threshold value for driving the electric oil pump and stopping the driving. Accordingly, it is possible to prevent the electric oil pump from being affected by the motoring of the motor.

According to another exemplary aspect of the invention form, since the hydraulic pressure maintained by the hydraulic control device at a time of restarting the engine is set to the hydraulic pressure necessary for engaging the frictional engagement element engaged at the starting time, it is possible to securely engage the frictional engagement element without generating any unpleasant shock at a time of starting the vehicle. Accordingly, it is possible to more smoothly restart the vehicle.

The invention is not limited to the embodiments as disclosed above, but various modifications can be permitted based on the spirit of the inventions, and these modifications shall not be excluded from the scope of the invention.

The disclosure of Japanese Patent Application No.2001-373917 filed on Dec. 7, 2001, including the specification, drawings and claims are incorporated by reference in their entirety.

What is claimed is:

1. A driving control device of a vehicle, comprising:
an automatic transmission that transmits a driving force of an engine to a wheel by engaging a frictional engagement element, comprising:
a hydraulic control device which hydraulically controls an engagement of the frictional engagement element;
a mechanical oil pump which is driven by the engine and supplies hydraulic pressure to said hydraulic control device, and
an electric oil pump which supplies hydraulic pressure to said hydraulic control device; and
a motor connected to said mechanical oil pump and transmitting the driving force to the automatic transmission, wherein said electric oil pump supplies oil to said hydraulic control device at an engine automatic stopping control time at which the driving of the engine is automatically stopped after the vehicle stops and a predetermined condition is established and said motor is driven so that said mechanical oil pump supplies the oil to said hydraulic control device during said engine automatic stopping control at a time when said electric oil pump can not be driven.

2. The driving control device according to claim 1, wherein the time when said electric oil pump can not be driven corresponds to at least one of a time when an oil temperature of a working fluid used in said automatic transmission is a low oil temperature lower than the oil temperature at a time when said electric oil pump is normally used, a time when the oil temperature of the working fluid is a high oil temperature higher than the oil temperature of said normal use and a time when said electric oil pump fails.

3. The driving control device according to either claim 2, wherein the oil is supplied to said hydraulic control device by driving said motor at a predetermined speed so as to drive said mechanical oil pump in said engine automatic stop control at a time when said electric oil pump can not be driven.

4. The driving control device according to claim 3, wherein said predetermined speed is set to a speed other than a resonance point of said engine.

5. The driving control device according to claim 3, wherein at a time of said engine automatic stop control, said electric oil pump is driven at a time when the speed of said engine becomes a first set speed, the driving of said electric oil pump is stopped at a time when the speed of said engine becomes a second set speed after said electric oil pump is driven, and said first and second set speeds are set to be smaller than said predetermined speed.

6. The driving control device according to claim 1, wherein the oil is supplied to said hydraulic control device by driving said motor at a predetermined speed so as to drive said mechanical oil pump during said engine automatic stop control at a time when said electric oil pump can not be driven.

7. The driving control device according to claim 6, wherein said predetermined speed is set to a speed other than a resonance point of said engine.

8. The driving control device according to claim 6, wherein at a time of said engine automatic stop control, said electric oil pump is driven at a time when the speed of said engine becomes a first set speed, the driving of said electric oil pump is stopped at a time when the speed of said engine becomes a second set speed after said electric oil pump is driven, and said first and second set speeds are set to be smaller than said predetermined speed.

9. The driving control device according claim 1, wherein the hydraulic pressure maintained by said hydraulic control device is set to a hydraulic pressure necessary for engaging the frictional engagement element engaged at a starting time.

10. A method of supplying oil to an automatic transmission which transmits a driving force of an engine of a vehicle to a wheel by engaging a frictional engagement element, a hydraulic control device which hydraulically controls an engagement of the frictional engagement element, a mechanical oil pump which is driven by the engine and supplies hydraulic pressure to said hydraulic control device and an electric oil pump which supplies hydraulic pressure to said hydraulic control device with a motor connected to said mechanical oil pump, and transmitting the driving force to the automatic transmission, comprising:
supplying the oil with the electric oil pump to said hydraulic control device at an engine automatic stopping control time at which the driving of the engine is automatically stopped after the vehicle stops and a predetermined condition is established; and
driving said motor so that said mechanical oil pump supplies the oil to said hydraulic control device during said engine automatic stopping control at a time when said electric oil pump can not be driven.

11. The method of claim 10, wherein the time when said electric oil pump can not be driven corresponds to at least one of a time when an oil temperature of a working fluid used in said automatic transmission is a low oil temperature lower than the oil temperature at a time when said electric oil pump is normally used, a time when the oil temperature of the working fluid is a high oil temperature higher than the oil temperature of said normal use and a time when said electric oil pump fails.

12. The method of claim 11, wherein the oil is supplied to said hydraulic control device by driving said motor at a predetermined speed so as to drive said mechanical oil pump in said engine automatic stop control at a time when said electric oil pump can not be driven.

13. The method of claim 12, wherein said predetermined speed is set to a speed other than a resonance point of said engine.

14. The method of claim 12, wherein at a time of said engine automatic stop control, said electric oil pump is driven at a time when the speed of said engine becomes a first set speed, the driving of said electric oil pump is stopped at a time when the speed of said engine becomes a second set speed after said electric oil pump is driven, and said first and second set speeds are set to be smaller than said predetermined speed.

15. The method of claim 10, wherein the oil is supplied to said hydraulic control device by driving said motor at a predetermined speed so as to drive said mechanical oil pump during said engine automatic stop control at a time when said electric oil pump can not be driven.

16. The method of claim 15, wherein said predetermined speed is set to a speed other than a resonance point of said engine.

17. The method of claim 15, wherein at a time of said engine automatic stop control, said electric oil pump is driven at a time when the speed of said engine becomes a first set speed, the driving of said electric oil pump is stopped at a time when the speed of said engine becomes a second set speed after said electric oil pump is driven, and said first and second set speeds are set to be smaller than said predetermined speed.

18. The method of claim 10, wherein the hydraulic pressure maintained by said hydraulic control device is set to a hydraulic pressure necessary for engaging the frictional engagement element engaged at a starting time.

* * * * *